US011635150B2

(12) United States Patent
Allen et al.

(10) Patent No.: US 11,635,150 B2
(45) Date of Patent: *Apr. 25, 2023

(54) WATERTIGHT CHECK VALVE

(71) Applicant: Mueller International, LLC, Atlanta, GA (US)

(72) Inventors: Sean Michael Allen, Chattanooga, TN (US); Justin Blaine Childress, Albertville, AL (US); Christopher Joseph Duckett, Albertville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,630

(22) Filed: Nov. 15, 2021

(65) Prior Publication Data

US 2022/0074512 A1 Mar. 10, 2022

Related U.S. Application Data

(63) Continuation of application No. 16/824,147, filed on Mar. 19, 2020, now Pat. No. 11,204,102.

(51) Int. Cl.
*F16K 15/03* (2006.01)
*E03B 9/04* (2006.01)
*F16K 17/36* (2006.01)

(52) U.S. Cl.
CPC ............. *F16K 15/033* (2013.01); *E03B 9/04* (2013.01); *F16K 15/036* (2013.01);
(Continued)

(58) Field of Classification Search
CPC .... F16K 15/033; F16K 15/035; F16K 15/036; F16K 15/038; Y10T 137/7839; Y10T 137/7875

See application file for complete search history.

(56) References Cited

U.S. PATENT DOCUMENTS

| 970,598 A | 9/1910 | Arnold |
| 1,065,023 A | 6/1913 | Blood |

(Continued)

OTHER PUBLICATIONS

Allen, Sean Michael; Corrected Notice of Allowance for U.S. Appl. No. 16/428,742, filed May 31, 2019, dated Aug. 31, 2021, 4 pgs.

(Continued)

*Primary Examiner* — Kevin F Murphy
(74) *Attorney, Agent, or Firm* — Taylor English Duma LLP

(57) ABSTRACT

A check valve includes a valve body defining a valve bore extending from a first axial end to a second axial end, the valve body including an annular body and a cross member secured to and extending across the valve bore from the annular body on one side of the valve body to the annular body on an opposite side of the valve body, the valve bore at the cross member divided into more than one portion by the cross member; a position block extending from the cross member; a valve member positioned within the valve body and configured to rotate between an open position and a closed position; and a pivot pin extending from the valve member, engaged with the position block, and fixed with respect to the valve member; the valve member and the pivot pin configured to rotate together between the open position and the closed position.

20 Claims, 21 Drawing Sheets

(52) U.S. Cl.
CPC .......... *F16K 15/038* (2013.01); *F16K 17/363* (2013.01); *Y10T 137/7839* (2015.04); *Y10T 137/7875* (2015.04)

(56) References Cited

U.S. PATENT DOCUMENTS

| | | | |
|---|---|---|---|
| 1,487,038 A | | 3/1924 | Spencer |
| 2,054,561 A | | 9/1936 | Greenberg |
| 2,717,001 A | | 9/1955 | Perrault |
| 2,923,317 A | | 2/1960 | McInerney |
| 3,007,488 A | * | 11/1961 | Wheeler, Jr. .......... F16K 15/038 137/454.2 |
| 3,677,297 A | | 7/1972 | Walton |
| 3,831,429 A | | 8/1974 | Kmiecik |
| 4,005,732 A | * | 2/1977 | Buckner .............. F16K 15/038 137/512.1 |
| 4,079,751 A | * | 3/1978 | Partridge .............. F16K 15/038 137/527 |
| 4,127,142 A | | 11/1978 | Snider |
| 4,230,148 A | * | 10/1980 | Ogle, Jr. .............. F16K 15/038 137/527 |
| 4,361,165 A | | 11/1982 | Flory |
| 4,596,263 A | | 6/1986 | Snider |
| 4,607,661 A | | 8/1986 | Wessels et al. |
| 4,774,981 A | * | 10/1988 | Mizusawa ............ F16K 15/038 137/515 |
| 5,010,919 A | | 4/1991 | Partridge |
| 5,088,905 A | * | 2/1992 | Beagle .................. F04C 29/126 418/270 |
| 5,158,265 A | | 10/1992 | Miyairi |
| 5,301,709 A | | 4/1994 | Gasaway |
| 5,509,437 A | | 4/1996 | Merrett |
| 5,609,179 A | | 3/1997 | Knapp |
| 5,711,343 A | | 1/1998 | Beckett |
| 6,029,949 A | | 2/2000 | Brown et al. |
| 6,726,176 B2 | | 4/2004 | Bauman |
| 6,851,255 B2 | | 2/2005 | Aitchison et al. |
| 7,152,622 B2 | | 12/2006 | Scaramucci et al. |
| 8,991,415 B1 | | 3/2015 | Luppino |
| 9,347,573 B2 | | 5/2016 | Feng et al. |
| 9,353,878 B2 | | 5/2016 | Plummer et al. |
| 9,581,256 B2 | | 2/2017 | Barone |
| 9,890,866 B2 | | 2/2018 | Kitchen et al. |
| 10,228,070 B2 | | 3/2019 | Minta |
| 10,407,882 B2 | | 9/2019 | Kitchen et al. |
| 10,539,244 B2 | | 1/2020 | Solarz et al. |
| 10,578,224 B2 | | 3/2020 | Reszewicz et al. |
| 10,612,690 B2 | | 4/2020 | Lesniewski |
| 11,204,102 B2 | | 12/2021 | Allen et al. |
| 2005/0224114 A1 | | 10/2005 | Cook et al. |
| 2007/0044847 A1 | | 3/2007 | Yang |
| 2007/0256740 A1 | | 11/2007 | Sugai et al. |
| 2008/0072973 A1 | | 3/2008 | McGonigle et al. |
| 2008/0078459 A1 | | 4/2008 | Warriner et al. |
| 2008/0135100 A1 | | 6/2008 | Davidson et al. |
| 2015/0240962 A1 | | 8/2015 | Plummer |
| 2016/0265197 A1 | | 9/2016 | Kitchen et al. |
| 2018/0171606 A1 | | 6/2018 | Kitchen |
| 2020/0378508 A1 | | 12/2020 | Allen et al. |
| 2021/0293340 A1 | | 9/2021 | Allen et al. |
| 2021/0404567 A1 | | 12/2021 | Allen et al. |
| 2022/0390037 A1 | | 12/2022 | Allen et al. |

OTHER PUBLICATIONS

Allen, Sean Michael; Corrected Notice of Allowance for U.S. Appl. No. 16/428,742, filed May 31, 2019, dated Sep. 20, 2021, 6 pgs.
Allen, Sean Michael; Corrected Notice of Allowance for U.S. Appl. No. 16/428,742, filed May 31, 2019, dated Sep. 24, 2021, 2 pgs.
Allen, Sean Michael; Non-Final Office Action for U.S. Appl. No. 16/428,742, filed May 31, 2019, dated Feb. 19, 2021, 25 pgs.
Allen, Sean Michael; Notice of Allowance for U.S. Appl. No. 16/428,742, filed May 31, 2019, dated Jun. 14, 2021, 11 pgs.
Clow Valve Co.; Images of Clow Valve, publicly available prior to May 31, 2019, 3 pgs.
Mueller; Brochure for Jones Tell-Tale Break-Off Check Valve, published Oct. 2018, 1 pg.
Mueller; Installation Instructions for J-5000 Break Check Valve, published Oct. 2018, 1 pg.
Allen, Sean Michael; Applicant-Initiated Interview Summary for U.S. Appl. No. 16/824,147, filed Mar. 19, 2020, dated Feb. 16, 2021, 8 pgs.
Allen, Sean Michael; Applicant-Initiated Interview Summary for U.S. Appl. No. 16/824,147, filed Mar. 19, 2020, dated Jul. 2, 2021, 7 pgs.
Allen, Sean Michael; Final Office Action for U.S. Appl. No. 16/824,147, filed Mar. 19, 2020, dated May 18, 2021, 19 pgs.
Allen, Sean Michael; Non-Final Office Action for U.S. Appl. No. 16/824,147, filed Mar. 19, 2020, dated Jan. 21, 2021, 20 pgs.
Allen, Sean Michael; Notice of Allowance for U.S. Appl. No. 16/824,147, filed Mar. 19, 2020, dated Aug. 16, 2021, 7 pgs.
Allen, Sean Michael; Supplemental Notice of Allowance for U.S. Appl. No. 16/824,147, filed Mar. 19, 2020, dated Sep. 2, 2021, 6 pgs.
Clow Valve Company; Specification Sheet for LP619 Low Profile Break Off Check Valve, publicly available by Aug. 27, 2019, 1 pg.
Clow Valve Co.; Brochure for LP619 Break-Off Checkvalve, publicly available by Aug. 27, 2019, 2 pgs.
Allen, Sean Michael; Applicant-Initiated Interview Summary for U.S. Appl. No. 17/473,542, filed Sep. 13, 2021, dated Nov. 17, 2022, 3 pgs.
Allen, Sean Michael; Non-Final Office Action for U.S. Appl. No. 17/473,542, filed Sep. 13, 2021, dated Sep. 27, 2022, 24 pgs.
Allen, Sean Michael; Non-Final Office Action for U.S. Appl. No. 17/340,659, filed Jun. 7, 2021, dated Nov. 21, 2022, 23 pgs.
Allen, Sean Michael; Applicant-Initiated Interview Summary for U.S. Appl. No. 17/340,659, filed Jun. 7, 2021, dated Jan. 23, 2023, 2 pgs.
Allen, Sean Michael; Notice of Allowance for U.S. Appl. No. 17/473,542, filed Sep. 13, 2021, dated Jan. 27, 2023, 13 pgs.

* cited by examiner

WATERTIGHT CHECK VALVE

REFERENCE TO RELATED APPLICATIONS

This application is a continuation of U.S. application Ser. No. 16/824,147, filed Mar. 19, 2020, which is hereby specifically incorporated by reference herein in its entirety.

TECHNICAL FIELD

Field of Use

This disclosure relates to check valves in a fluid distribution system. More specifically, this disclosure relates to check valves comprising a watertight structure from end-to-end.

Related Art

Check valves can be useful in preventing backflow in a fluid distribution system and thereby allowing fluid flow in only one direction. Typical check valves, however, can be bulky and therefore difficult and expensive to install. In addition, a typical check valve can comprise pivot pins extending through a wall of a valve body of the check valve. Extending the pivot pins through the wall of the valve body can create a potential leak path (or even multiple leak paths) between an interior cavity and an exterior of the valve. Even if a seal for such a leak path prevents leakage initially, failure of the seal can leak to leakage of the fluid of the fluid distribution system therefrom.

More specifically, property damage and water loss can occur when a pipe termination fitting such as a hydrant—in particular a wet barrel fire hydrant—is hit by a moving vehicle or otherwise broken free from its usual position in a water distribution system. While an in-line check valve configured for use with a hydrant could mitigate such property damage and water loss, such valves can be, as noted above, large and cumbersome, expensive, and ineffective in one way or another. Because of the number of hydrants in a typical water distribution system, an overly complex break check valve can be an impractical system-wide solution, especially if there is a risk of leaks, as previously discussed. Moreover, overly rapid closure of such a valve can cause not only water hammer but also a pressure spike resulting in an excessive load on the components of the system sufficient in some cases to cause a failure of one or more of those components.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a check valve comprising: a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member; a position block extending from the valve body; a pair of valve members positioned within the valve body and configured to rotate between an open position and a closed position; and a pivot pin extending from the valve member, engaged with the position block, and fixed with respect to the valve member; the valve member and the pivot pin configured to rotate together between the open position and the closed position.

In a further aspect, disclosed is a check valve comprising: a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member; a position block extending from the valve body; a pair of valve members positioned within the valve body and configured to rotate between an open position and a closed position; and a pair of pivot pins, a pivot pin of the pair of pivot pins extending from each valve member of the pair of valve members, engaged with the position block, and fixed with respect to the corresponding valve member; each valve member and the corresponding pivot pin configured to rotate together between the open position and the closed position.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
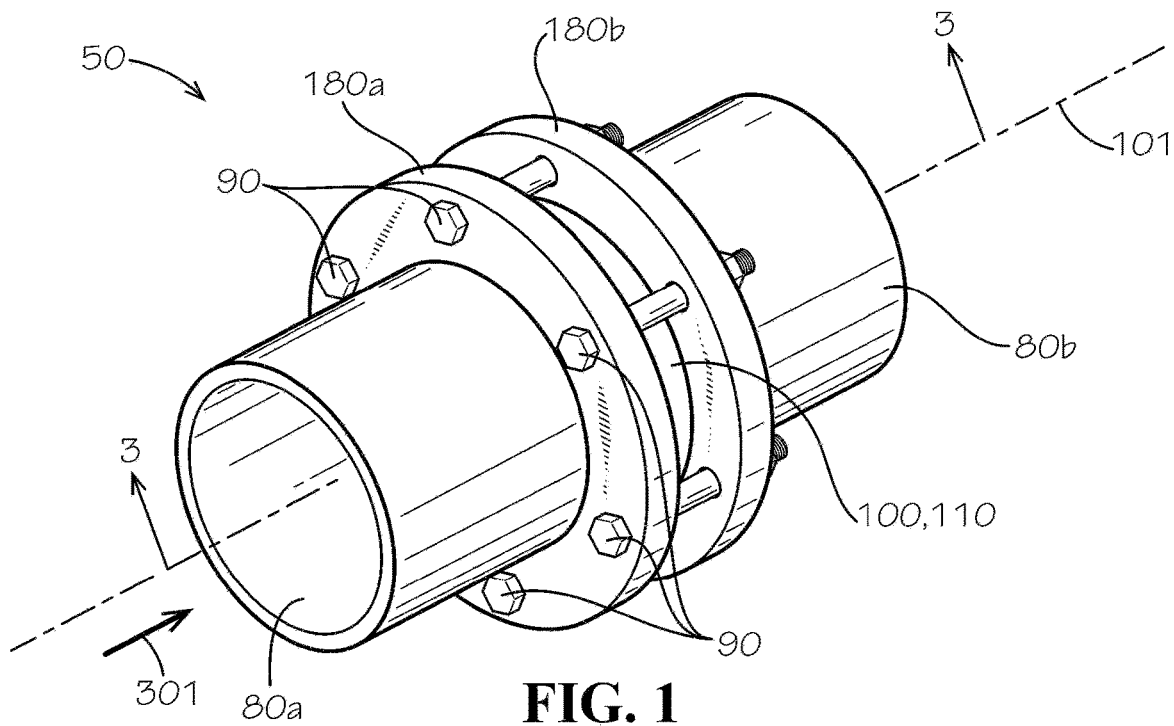
FIG. 1 is a perspective view of a check valve in a fluid distribution system in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a check valve nearest to an outlet of the valve, and "rear" is that end of the check valve that is opposite or distal the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a check valve and associated methods, systems, devices, and various apparatuses are disclosed herein. In one aspect, the check valve can comprise a pivot pin or a position block or both.

Figure 2:
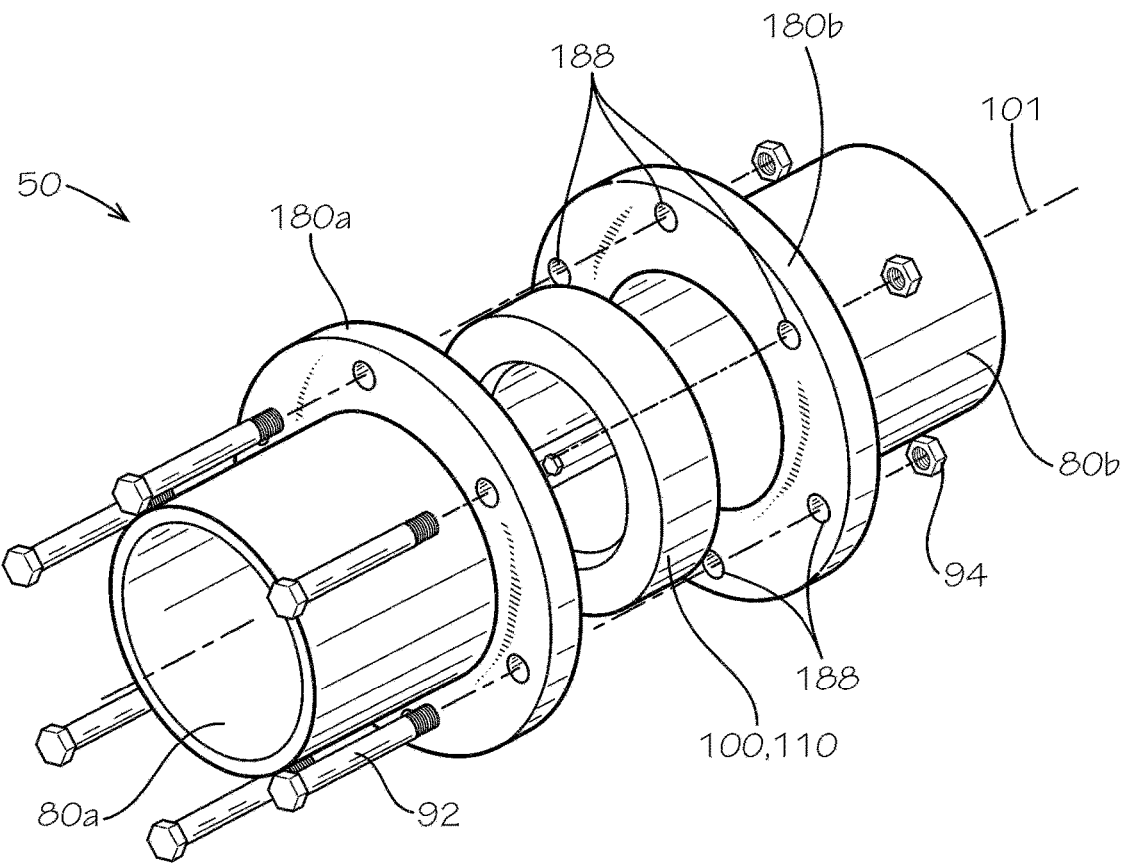
FIG. 2 is an exploded perspective view of the fluid distribution system of FIG. 1.

FIG. 1 is a perspective view and FIG. 2 is an exploded perspective view of a check valve 100 in a fluid or water distribution system 50, which can comprise and contain a fluid under pressure, such as water, in accordance with one aspect of the current disclosure. The check valve 100 can be positioned between a first pipe fitting 80*a* and a second pipe fitting 80*b*, and the check valve 100 can be secured to each of the first pipe fitting 80*a* and the second pipe fitting 80*b*. The check valve 100 can be secured to each of the first pipe fitting 80*a* and the second pipe fitting 80*b* with fasteners 90, each of which can comprise, for example and without limitation, a bolt 92 (shown in FIG. 2) and a nut 94 (shown in FIG. 2). Individually or in combination, the check valve 100 and the pipe fittings 80*a,b* can define and be aligned along a central axis 101. The check valve 100 can further define a flow direction 70 and a backflow direction, which is opposite of the flow direction 70. The check valve 100 can comprise a valve body 110. In some aspects, the structures disclosed in U.S. patent application Ser. No. 16/428,742, which was filed May 31, 2019, and is hereby incorporated by reference in its entirety, can be incorporated into the check valve 100, and vice versa.

The pipe fittings 80*a,b* can be any one of a variety of components of the system 50 such as, for example and without limitation, an extension barrel, a hydrant shoe, or, as shown, simply a pipe of some length of pipe adequate to connect to another portion of the system 50. The pipe fittings 80*a,b* can comprise flanges 180*a,b*, which can be mounting flanges and can define mounting holes 188 extending through the flanges 180*a,b*. The fasteners 90 can extend, for example and without limitation, through the mounting holes 188. A seal (not shown) can be positioned between each of the pipe fittings 80*a,b* and the check valve 100. In some aspects, the seal can comprise any elastomer or elastomeric material such as, for example and without limitation, Buna-N rubber (i.e., nitrile rubber or acrylonitrile butadiene rubber), ethylene propylene diene monomer (EPDM) rubber, natural rubber, or silicone.

Figure 3:
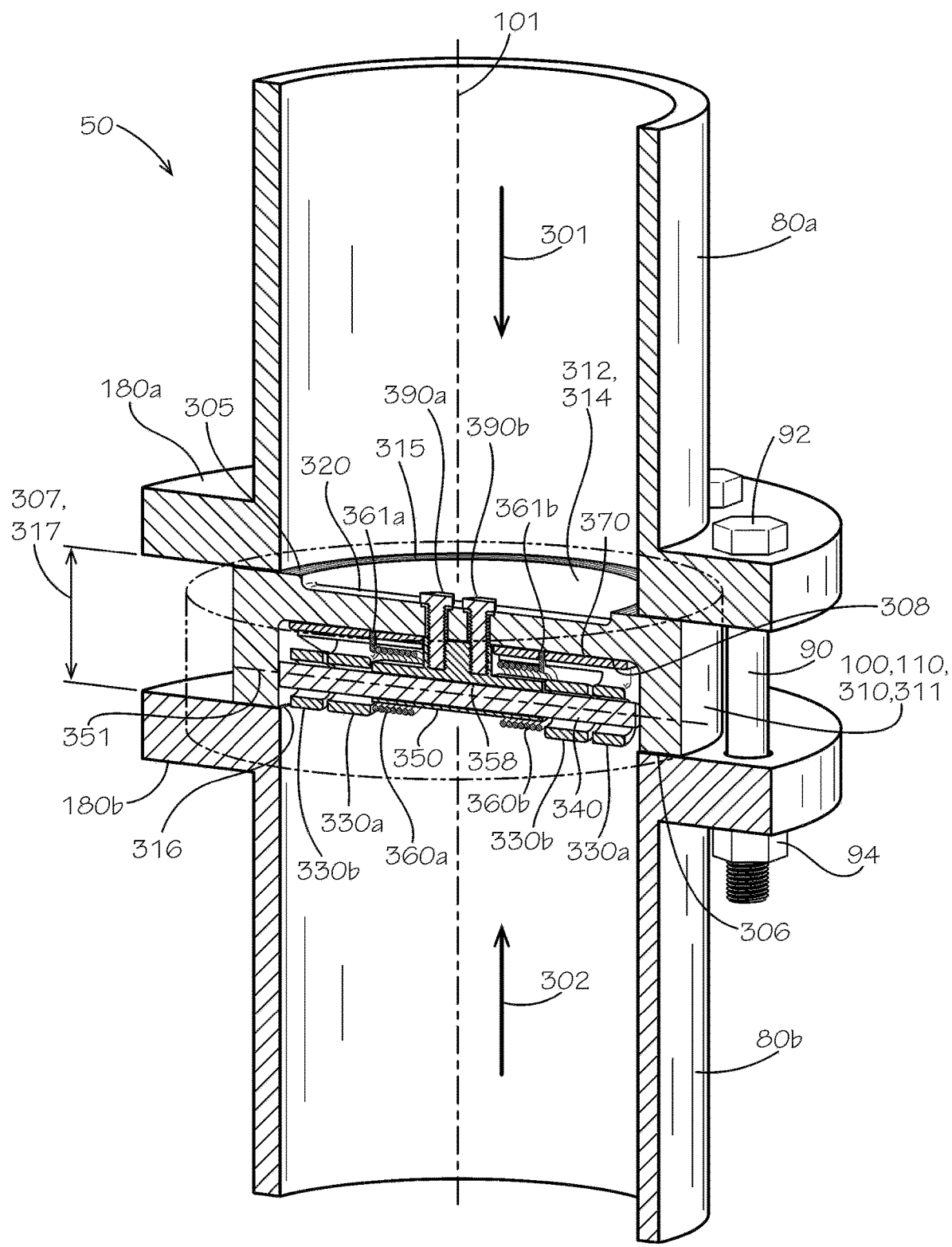
FIG. 3 is a sectional perspective view of the check valve of FIG. 1 in a closed position and taken along line 3-3 of FIG. 1.

FIGS. 3-6 disclose the check valve 100 in accordance with one aspect of the current disclosure. FIG. 3 specifically is a sectional perspective view of the check valve 100 in a closed position. The valve body 110 can comprise an annular body 310 and a cross member 320, which can extend from one side of the annular body 310 to another side of the annular body 310 and can be recessed or offset from a first axial end 305 of the check valve 100, which can be a valve inlet in some aspects and a valve outlet in other aspects. In some aspects, as shown, the cross member 320 can be formed monolithically with the valve body 110. In other aspects, the cross member 320 can be formed separately from the valve body 110. The system 50 can define a positive flow direction 301 and a negative flow direction 302, which can be a backflow or reverse flow direction.

The check valve 100 and, more specifically, the valve body 110 can define a valve inner cavity 312 defining a valve bore 314, which can extend from the first axial end 305 to a second axial end 306 of the check valve 100, which can be a valve outlet in some aspects and a valve inlet in other aspects. As shown, the valve body 110 can extend unbroken from the first axial end 305 to the second axial end 306 and can form or define a watertight structure between the first axial end 305 and the second axial end 306. More specifically, the valve body 110 can define respective axial end openings 315,316 at only the first axial end 305 and the second axial end 306. In some aspects not shown here but shown in the aforementioned U.S. patent application Ser. No. 16/428,742, a pivot pin 340 of the check valve 100 can be inserted through holes defined in one or more sides of the annular body 310 of the valve body 110 and the hole(s) plugged. While this construction can be easier to manufacture, a potential leak path (or even multiple leak paths) between the valve inner cavity 312 and an exterior of the check valve 100 can result. Even if a seal for such a leak path prevents leakage initially, failure of the seal can leak to leakage of the fluid of the fluid distribution system therefrom. In some aspects, as shown, a length of the pivot pin 340 can be less than or equal to an inner diameter 570 (shown in FIG. 5) of the valve bore 314 at an axial position of the pivot pin 340 relative to the central axis 101 of the check valve 100. In some aspects, as shown, an entirety of the pivot pin 340 can be positioned within the valve bore 314. In other aspects, the length of the pivot pin 340 can be greater than or equal to the inner diameter 570 and the pivot pin 340 can still not extend completely through the annular body 310 of the valve body 110 so as to require an opening in an exterior surface 311 of the annular body 310.

The check valve 100 can comprise one or more valve members 330*a,b*. The valve member 330 or the valve members 330 can be positioned within the valve body 110 and can be configured to rotate about the pivot pin 340 from an open position of the valve member 330 to a closed position of the valve member 330, which can correspond to an open position and a closed position, respectively, of the check valve 100. In some aspects, any of the valve members 330 can be configured to remain in the open position of the valve member 330 and in the open position of the check valve 100 as long as a fluid in the fluid distribution system 50 is moving in the positive flow direction 301 of the check valve 100, and the valve member can be configured to close when the fluid is moving in the negative flow direction 302 of the check valve 100 or when the fluid is not moving through the check valve 100 at all.

The check valve 100 can comprise a position block 350, which can be sized and otherwise configured to receive the pivot pin 340. The position block 350 can more specifically position and secure the pivot pin 340 and can do so independently from any other portion of the valve body 110. The position block 350 can define a pin bore or pivot bore 358 defining a pivot axis 351 along which the pivot pin 340 can be installed and aligned. More specifically, as suggested above with respect to a length of the pivot pin 340, an entirety of the pivot pin 340 can be positioned within the valve body 110 and extending through the pivot bore 358 of the position block 350. In some aspects, as shown, the position block 350 can be secured to the valve body 110 with one or more fasteners 390*a,b*. A biasing element 360*a,b* can maintain a position of each of the corresponding valve members 330*a,b* in the aforementioned open position until flow of the fluid reverses and causes closure of the check valve 100. A position of a first end 361*a,b* of either or both of the biasing elements 360*a,b* can be fixed with respect to one of the position block 350, the valve body 110, and any other stationary portion of the check valve 100. As shown, the position of the first end 361*a,b* of both of the biasing elements 360*a,b* can be fixed with respect to a seal 370 of the check valve 100 by extending through openings 678*a,b* (shown in FIG. 6) in the seal 370.

The valve body 110 can be monolithic, i.e., it can be formed into a watertight structure from a single piece of material and can remain so formed. The check valve 100 can further comprise the seal 370, which can be positioned between the valve body 110 and the valve member 330 in the closed positions of the valve member 330 and the check valve 100. In some aspects, as shown, an axial length 317 of a portion of the valve body 110 extending between the flanges 180*a,b* of the respective pipe fittings 80*a,b* can be greater than or equal to an overall height or overall axial length 307 of the check valve 100. As shown, the check valve 100 can be wafer valve, which need not comprise its own mounting flanges but can instead be positioned, installed, and sandwiched between the flanges 180a,b of the respective pipe fittings 80a,b. More specifically, an outer diameter of the valve body 110 can be larger an inner diameter of the corresponding pipe fitting 80a,b and can thereby be contacted and captured by axial ends of the pipe fittings 80a,b.

Figure 4:
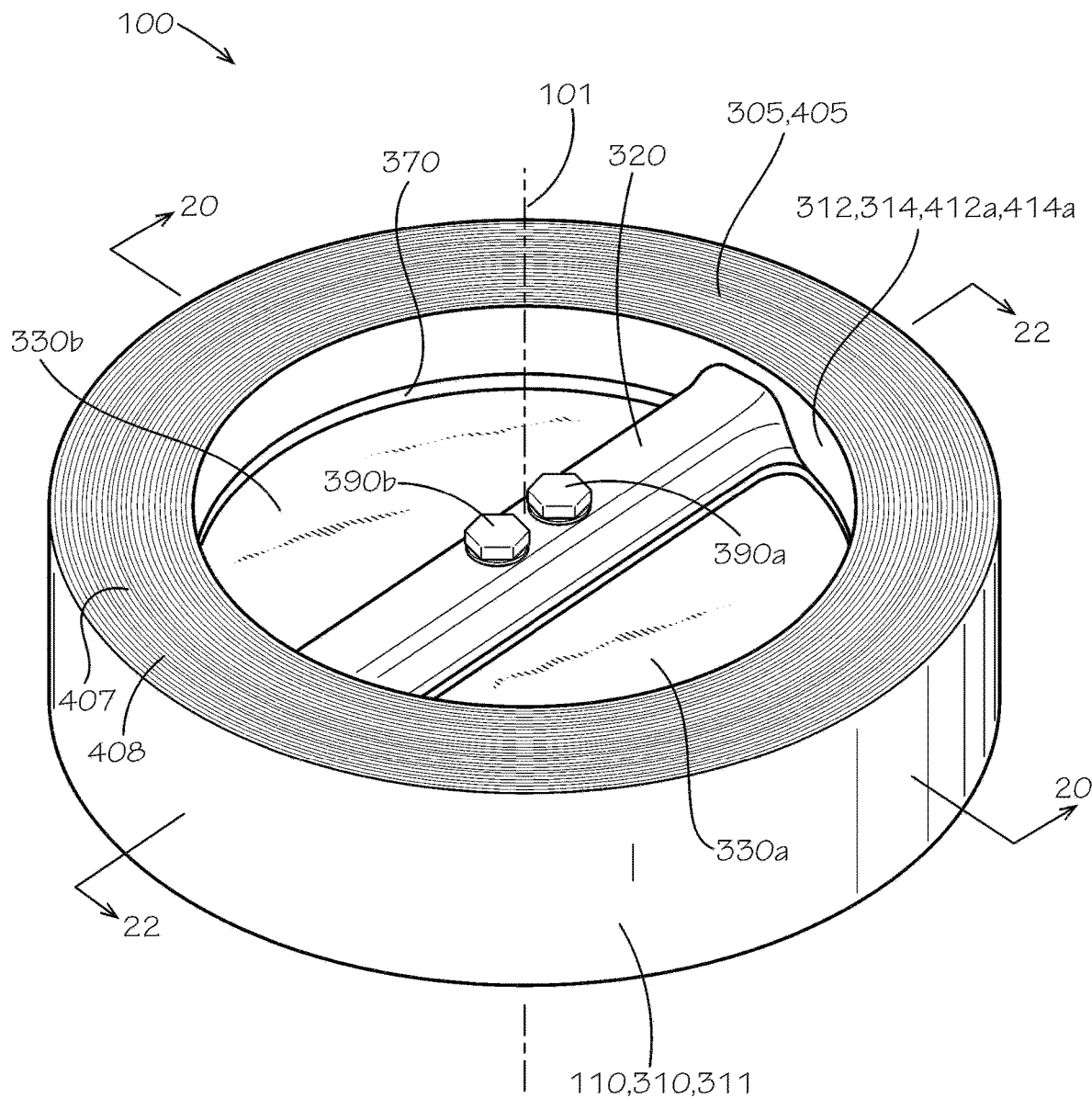
FIG. 4 is a first end or top perspective view of the check valve of FIG. 1 in the closed position.

FIG. 4 is a first end or top perspective view of the check valve 100 in the closed position showing the first axial end 305 defining a first end surface 405. As shown, a portion of the valve inner cavity 312 and the valve bore 314 can be on either side of the valve members 330a. More specifically, first portions 412a,414a of the valve inner cavity 312 and the valve bore 314, respectively, can be defined between the first axial end 305 and the valve members 330a,b, respectively; and second portions 412b,414b (shown in FIG. 5) of the valve inner cavity 312 and the valve bore 314, respectively, can be defined between the second axial end 306 and the valve members 330a,b, respectively.

Figure 5:
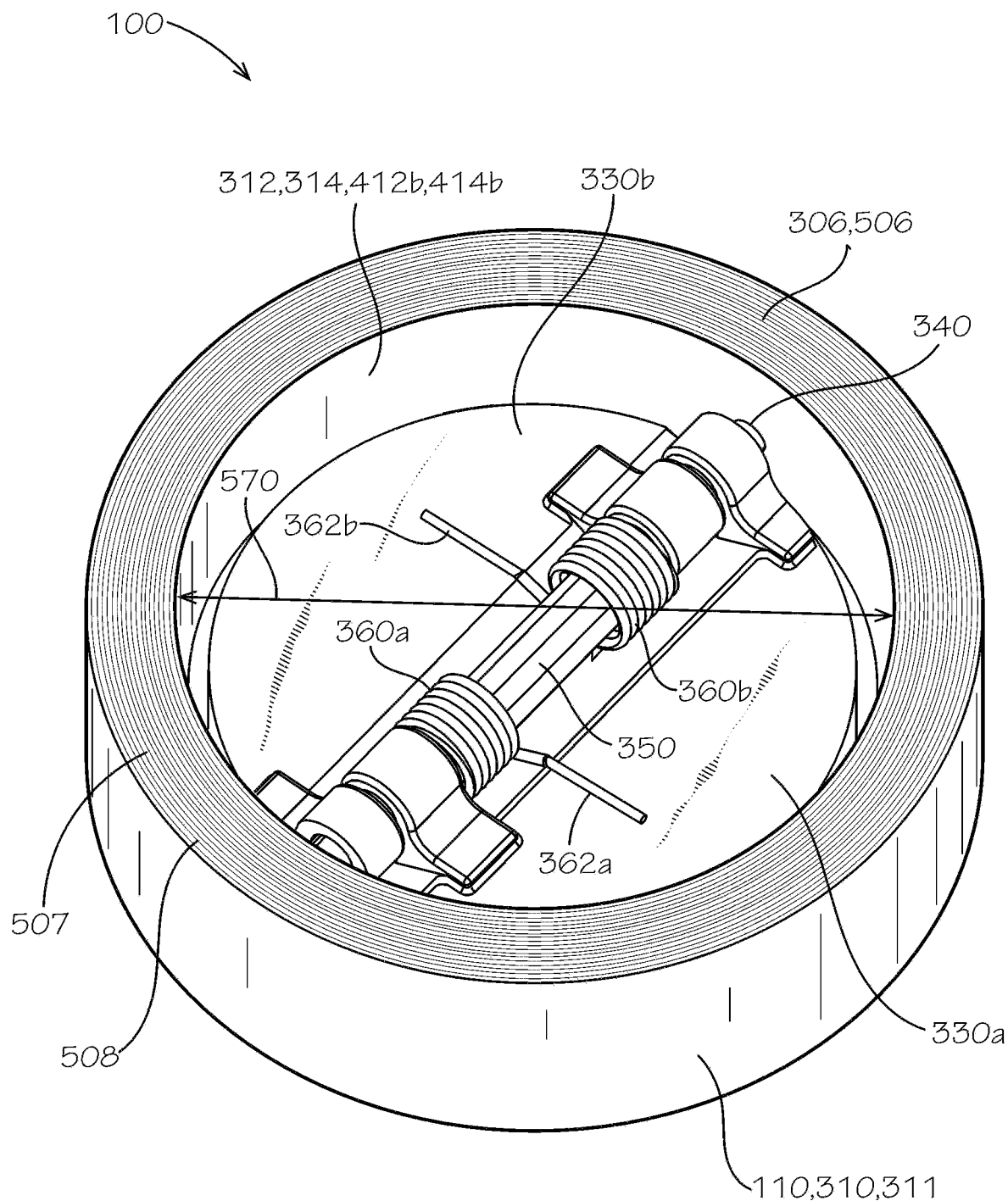
FIG. 5 is a second end or bottom perspective view of the check valve of FIG. 1 in the closed position.

FIG. 5 is a second end or bottom perspective view of the check valve 100 in the closed position showing the second axial end 306. The biasing elements 360a,b, either or both of which can be a torsion spring, can define respective second ends 362a,b. The biasing elements 360a,b can be pre-loaded upon installation, in which case the second ends 362a,b can push against the valve members 330a,b to keep the valve members 330a,b biased towards or held in a particular position during normal operation of the check valve 100. In some aspects, the valve members 330a,b can be biased towards or held in the open position. In other aspects, the valve members 330a,b can be biased towards or held in the closed position. As shown, the biasing elements 360a,b can encircle or surround portions of and thereby be fixed in relative position with respect to the position block 350.

Either or both of the first axial end 305 and the second axial end 306 can define a phonographic finish or a concentric finish. As shown, fine ridges 407,507 (407 shown in FIG. 4) separated by fine grooves 408,508 (408 shown in FIG. 4) can be defined, respectively, in either or both of the first end surface 405 (shown in FIG. 4) defined by the first axial end 305 (shown in FIG. 4) and a second end surface 506 defined by the second axial end 306.

Figure 6:
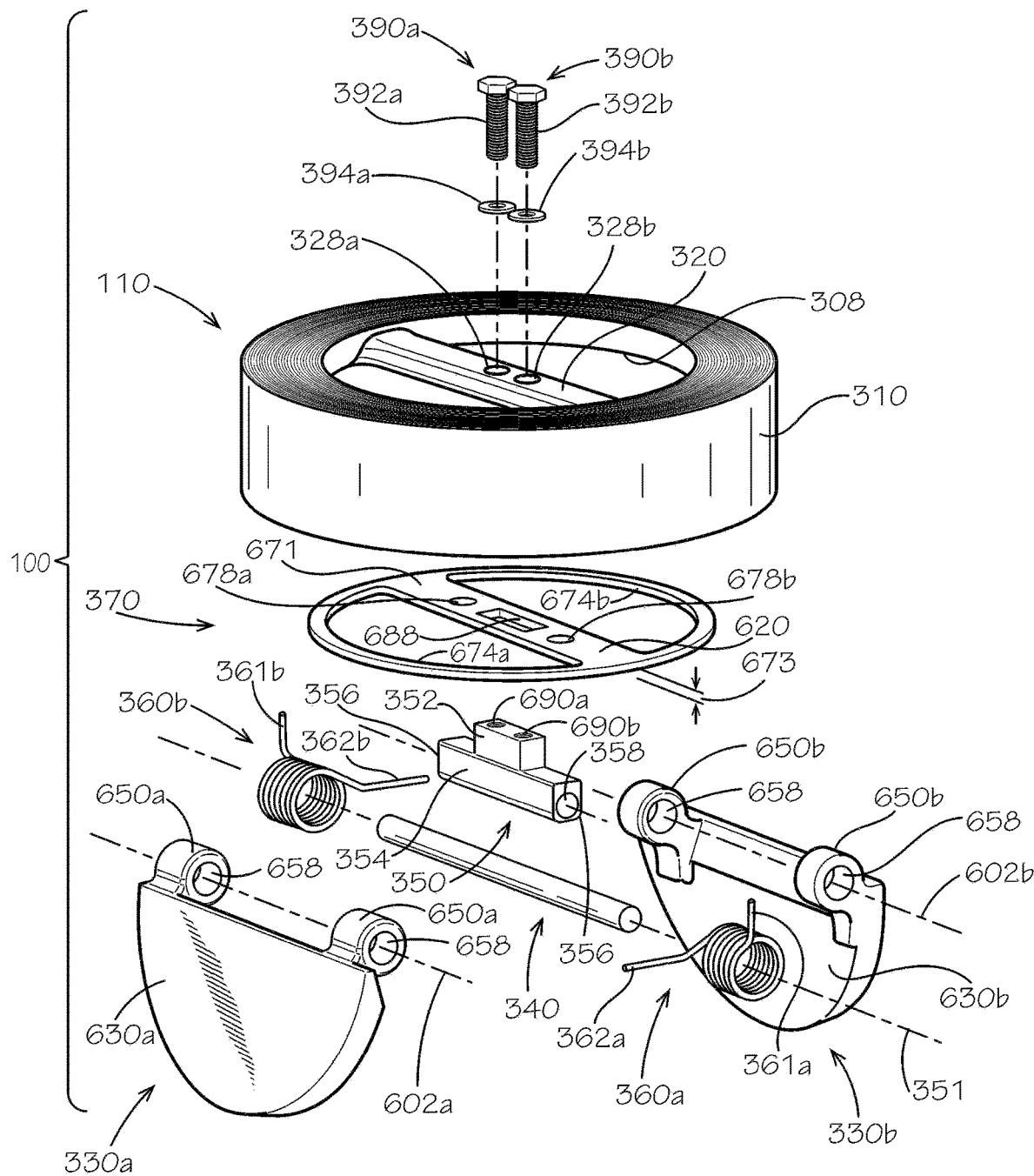
FIG. 6 is an exploded perspective view of the check valve of FIG. 1.

FIG. 6 is an exploded perspective view of the check valve 100 with plates 630a,b of the valve members 330a,b oriented in an open position. In one sense, the valve members 330a,b can be collectively described as a single valve member. The pivot pin 340 can be received within the pivot bore 358, which again can define the pivot axis 351. Each of the pivot pin 340 and the valve members 330a,b can be aligned and assembled along the pivot axis 351.

The position block 350 can comprise a base end or base portion 352 proximate to the valve body 110 and, more specifically, the cross member 320 in an assembled position of the position block 350. The position block 350 can comprise a distal end or distal portion 354, which can comprise one or more trunnions 356. As shown, the distal portion 354 of the position block 350 can comprise a pair of opposing trunnions 356, and the position block 350 can define a T-shape when viewed from a position angled with respect to the pivot axis 351. In some aspects, an overall length of the distal portion 354 of the position block 350 can be greater than a length of the base portion 352 of the position block 350. The position block 350 can define fastener bores 690a,b, which can be sized to receive the fasteners 390a,b. As shown, the fasteners 390a,b can define fastener shafts 392a,b, which can be threaded, and can comprise washers 394a,b. The fasteners 390a,b can extend through fastener bores 328a,b defined in the cross member 320.

The valve members 330a,b can nest together and can define valve bore axes 602a,b, which can align along or with the pivot axis 351. Each of the valve members 330a,b and, more specifically, the plates 630a,b can define a lug or a plurality of lugs 650a,b, each of which can define a pivot bore 658 defining the valve bore axes 602a,b. In some aspects, the pivot bore 658 of each of the lugs 650a,b can be smooth and each of the valve members 330a,b can be configured to rotate about and with respect to the pivot pin 340. In some aspects including the double disc configuration shown, each of the valve members 330a,b can comprise a half disc and can define a substantially semicircular shape.

In some aspects, the biasing elements 360a,b can be aligned and assembled along the pivot axis 351 and can be assembled about the pivot pin 340 and the position block 350. As shown, the second ends 362a,b of the biasing elements 360a,b can be angled with respect to the respective first ends 361a,b. Each of the biasing elements 360a,b can define one or more coils. As shown, each of the biasing elements 360a,b can comprise approximately 6 coils, which can be circular.

The seal 370, which can be a shim or spacer, can be positioned along the central axis 101 (shown in FIG. 3) of the check valve 100 below an internal flange 308 and, additionally, between the internal flange 308 of the valve body 110 and the valve members 330a,b. The seal 370 can define a first or upper surface 671 and a second or lower surface 672 (shown in FIG. 14) opposite from the upper surface 671. The seal 370 can define a thickness 673, an outer diameter, and an inner diameter. The seal 370 can define openings 674a,b, which can extend from the upper surface 671 to the lower surface and can define the inner diameter of the seal 370. The inner diameter of the seal 370 can be substantially equal to at least an inner diameter of the valve body 110 proximate to the internal flange 308, and the outer diameter of the seal 370 can be substantially equal to at most an inner diameter of the valve body 110 adjacent to the internal flange 308. The seal 370 can itself define a cross member 620. The seal 370 and, more specifically, the cross member 620 can define an opening 688, which can be sized to receive at least the base portion 352 of the position block 350 and, at least in aspects in which the position block 350 is already secured to or formed from the valve body 110 can be sized to receive also the distal portion 354 of the position block 350.

The seal 370 can comprise a soft, elastic material that when contacted by the valve members 330a,b will compress and thereby dampen any pressure spike in the system 50 upon closure of the check valve 100. In some aspects, the seal 370 can comprise any elastomer or elastomeric material such as, for example and without limitation, Buna-N rubber, EPDM rubber, natural rubber, or silicone. In some aspects, the seal 370 can comprise another compressible material. In various aspects, a material hardness of the seal 370 can measure less than 60 on the Shore A scale. In various aspects, a material hardness of the seal 370 can measure within a range between 10 on the Shore A scale and 20 on the Shore A scale. In various aspects, a material hardness of the seal 370 can measure 10 on the Shore A scale or 20 on the Shore A scale. In some aspects, the seal 370 can define an overall thickness that is less than a thickness of the plates 630a,b of the valve members 330a,b. In various aspects, the seal 370 can be used in combination with another dampener (not shown).

Figure 7:
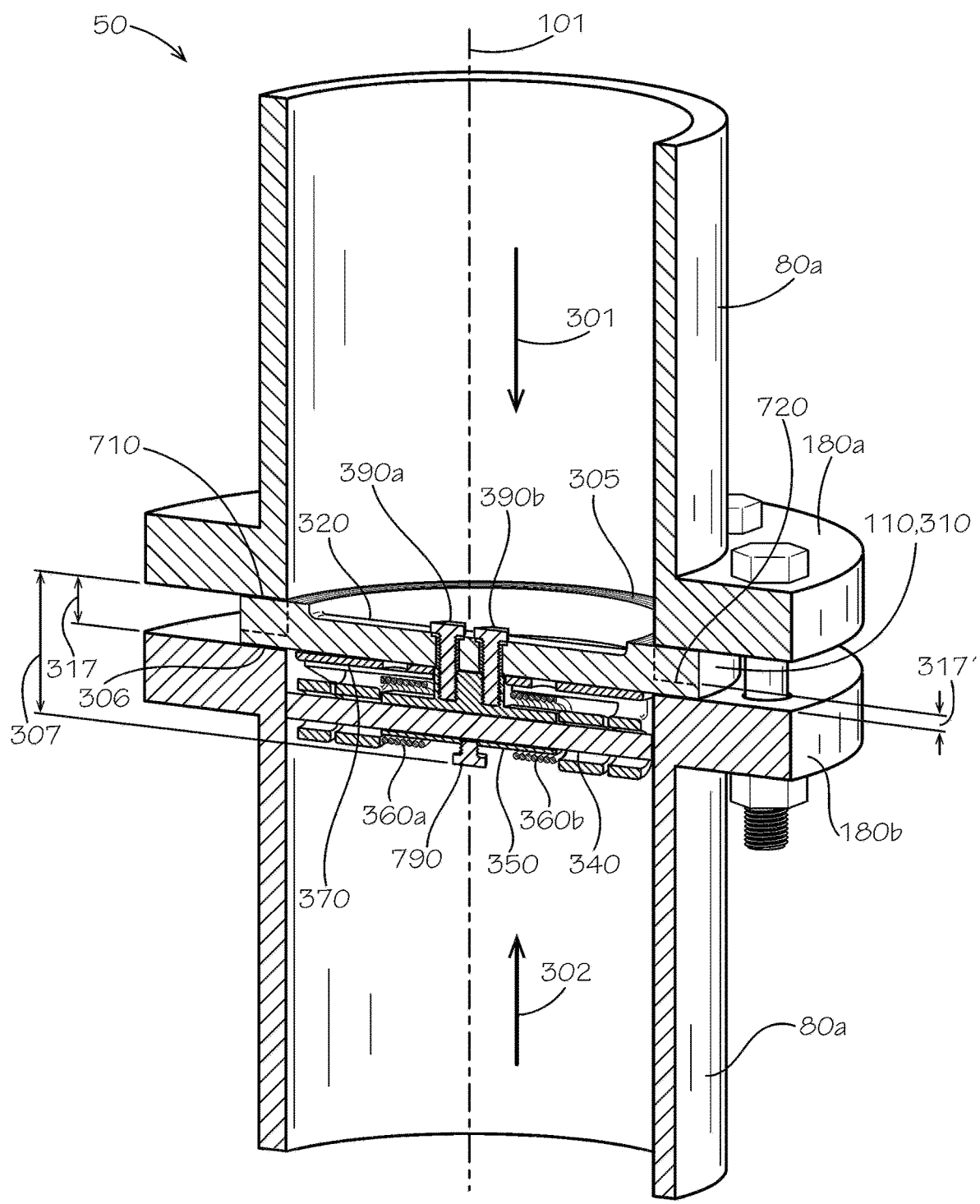
FIG. 7 is a sectional perspective view of the check valve of FIG. 1 taken along line 3-3 of FIG. 1 in accordance with another aspect of the current disclosure.

FIGS. 7-10 disclose the check valve 100 in accordance with another aspect of the current disclosure. FIG. 7 specifically is a sectional perspective view of the check valve 100 in a closed position. In some aspects, as shown, the axial length 317 of the valve body 110 can be shorter than the overall axial length 307 of the check valve 100. The annular body 310, including in some aspects when the valve 100 is a wafer valve as shown, can comprise a flange 710, which can fit between the flanges 180a,b of the respective pipe fittings 80a,b. In some aspects, the flange 710 and, more generally, the valve body 110 can define a step 720 defining a minimum thickness or minimum axial length 317' of the flange 710. The step 720, shown only as a cross-sectional shape in FIG. 7, can vary from the shape shown and can extend around a perimeter of the annular body 310. Accordingly, an overall collective diameter of the valve members 330a,b can be less than an inner diameter of the pipe fittings 80a,b and can be configured to fit within the pipe fittings 80a,b as shown. The check valve 100 can comprise a fastener 790, which can secure a position of the pivot pin 340 relative to the position block 350. In some aspects, as shown, the fastener 790 can simply secure a position of the pivot pin 340 by maintained pressurized contact against an outer surface of the pivot pin 340 or can extend only partially through the pivot pin 340.

Figure 8:
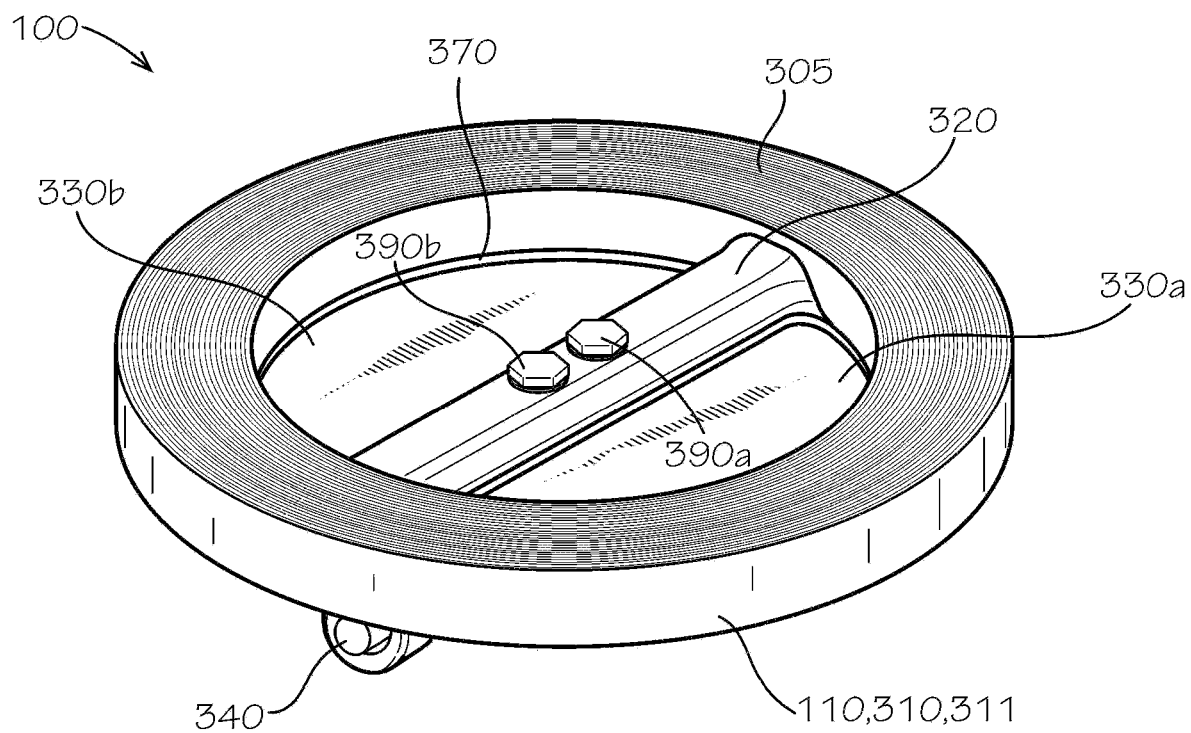
FIG. 8 is a first end or top perspective view of the check valve of FIG. 7.
Figure 9:
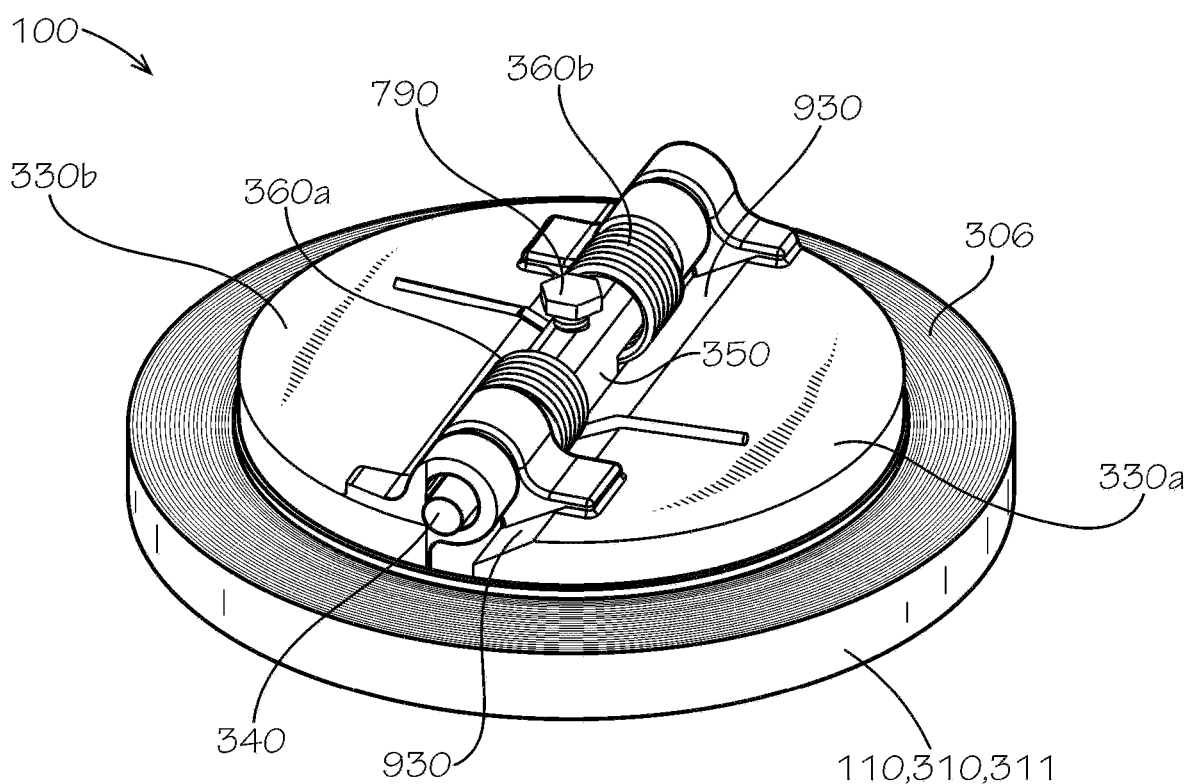
FIG. 9 is a second end or bottom perspective view of the check valve of FIG. 7.
Figure 10:
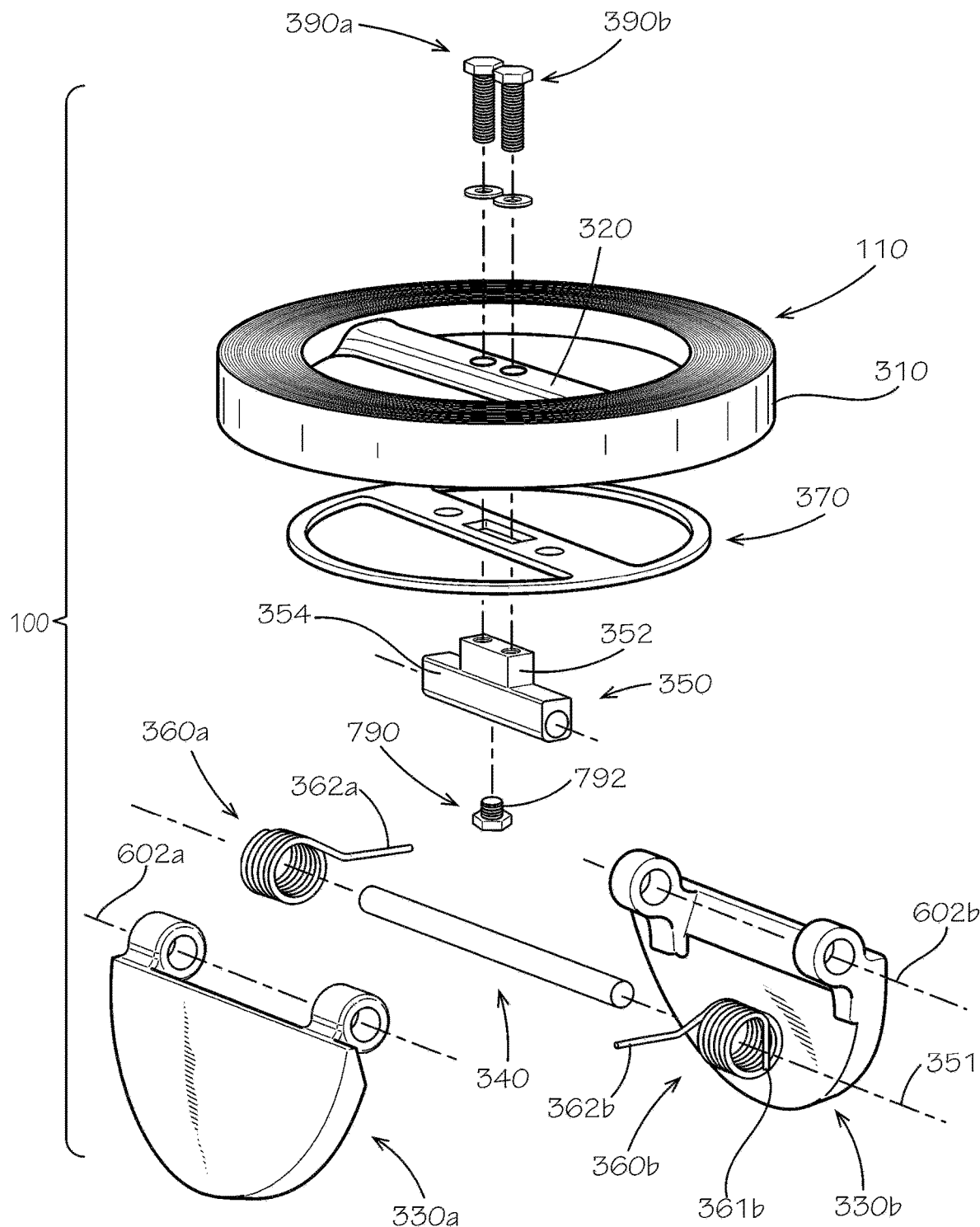
FIG. 10 is an exploded perspective view of the check valve of FIG. 7.

FIG. 8 is a first end or top perspective view, FIG. 9 is a second end or bottom perspective view, and FIG. 10 is an exploded perspective view of the check valve 100. As shown in FIG. 9, the valve members 330a,b can define a chamfer or other edge treatment 930 at an inboard edge proximate to the pivot pin 340. As shown in FIG. 10, the fastener 790 can define a fastener shaft 792, which can be threaded, and can comprise a washer (not shown). The fastener 790 can extend through a fastener bore 798 (shown in FIG. 14) defined in the position block 350. As also shown, the first end 361a,b of either respective biasing element 360a,b can be bent towards a center of coil formed by the biasing element 360a,b and thereby can forming a locking turn of the first end 361a,b, which can engage with the distal portion 354 of the position block 350. As shown, a total number of coils of the biasing element 360a,b can be reduced as needed so that the locking turn formed by the first end 361a,b, which can be facing away from the central axis 101 (shown in FIG. 3), encircles and engages with the position block 350.

Figure 11:
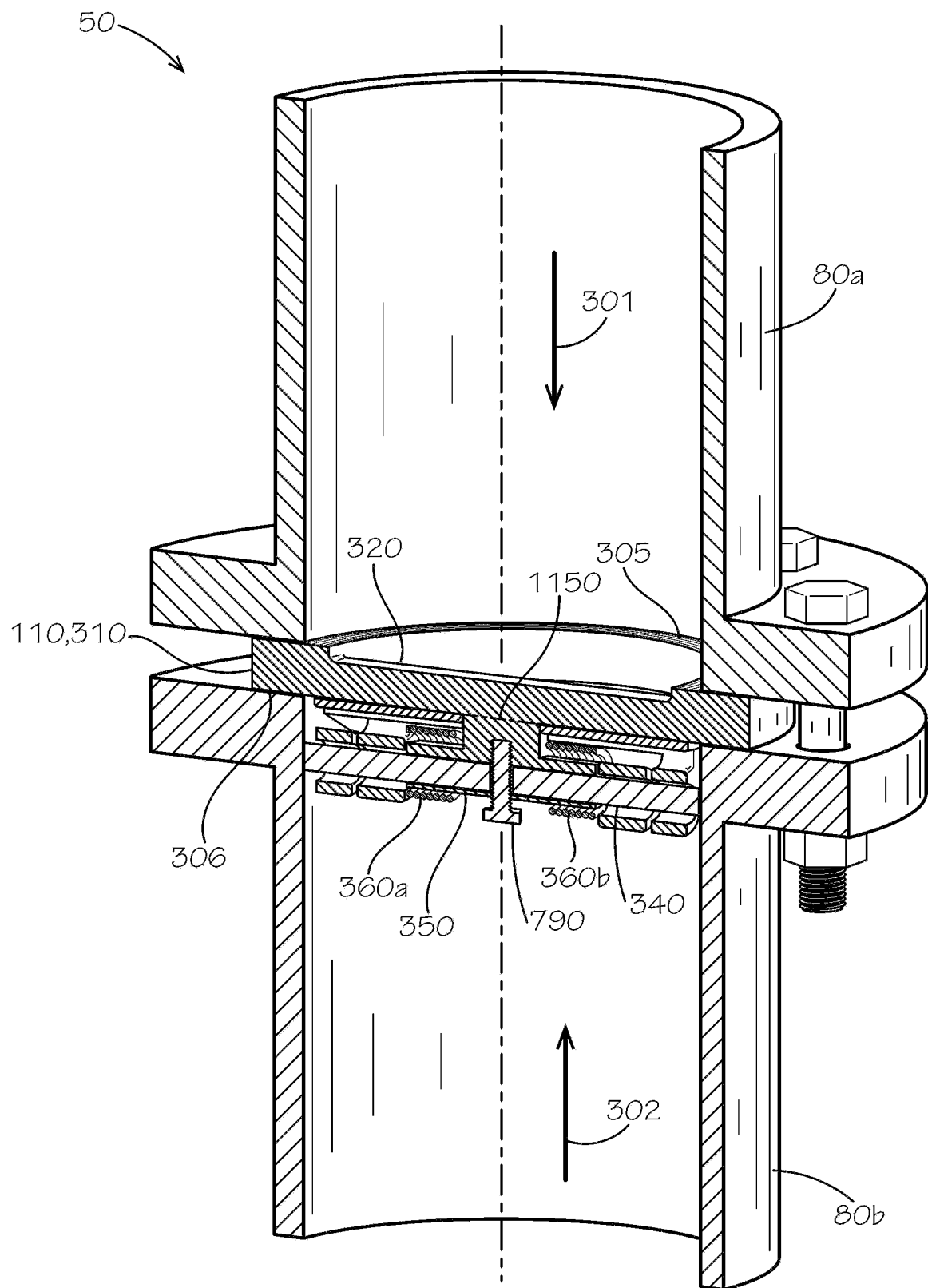
FIG. 11 is a sectional perspective view of the check valve of FIG. 1 taken along line 3-3 of FIG. 1 in accordance with another aspect of the current disclosure.

FIGS. 11-14 disclose the check valve 100 in accordance with another aspect of the current disclosure. FIG. 11 specifically is a sectional perspective view of the check valve 100 in a closed position. In some aspects, as shown, the position block 350 can be formed monolithically with the valve body 110. In other aspects, the position block 350 can be secured to the valve body 110 other than with the aforementioned fasteners 390a,b (shown in FIG. 3). In some aspects, the position block 350 can be secured to the valve body 110 with another fastener such as an adhesive or a weldment, such as at an intersection 1150 between the position block 350 and the cross member 320. In some aspects, as shown, the fastener 790 can extend through the pivot pin 340.

Figure 12:
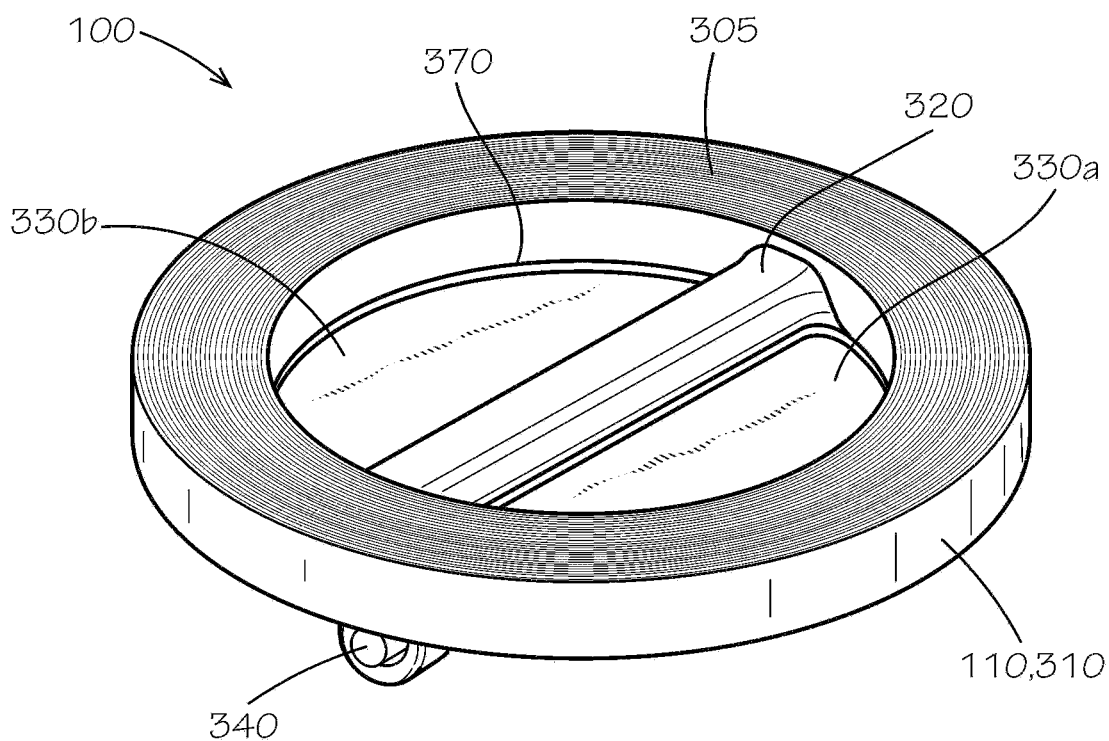
FIG. 12 is a first end or top perspective view of the check valve of FIG. 11.
Figure 13:
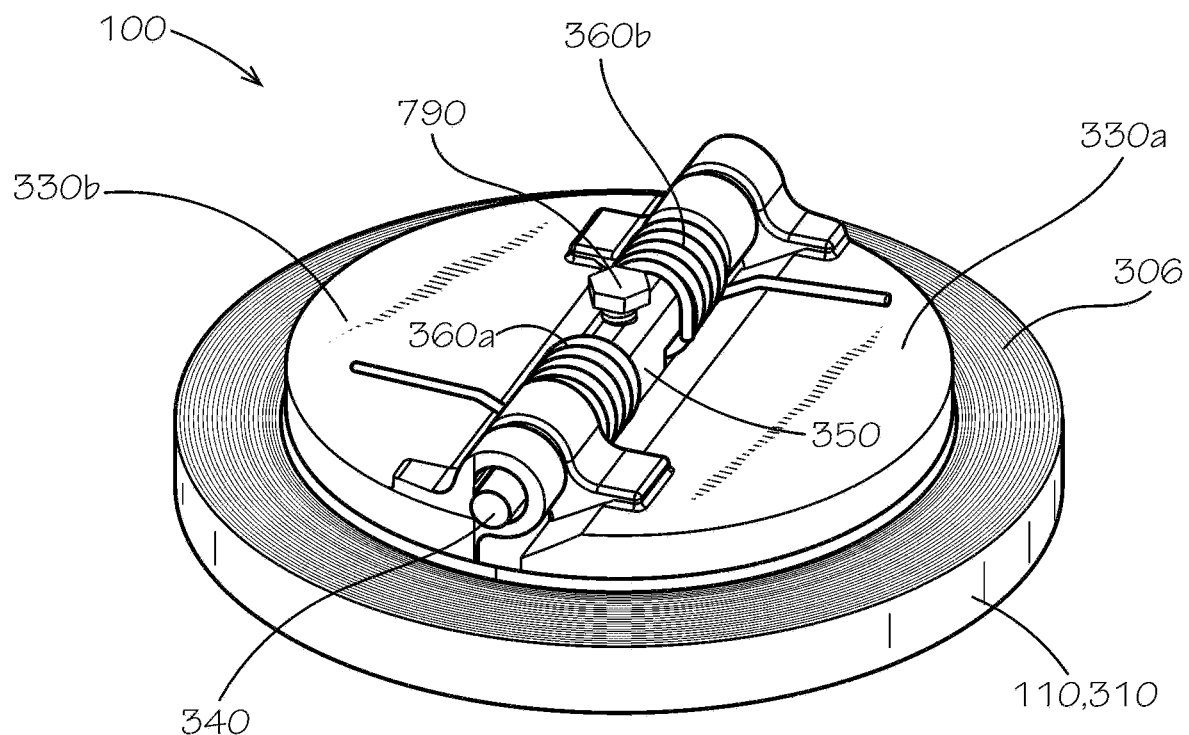
FIG. 13 is a second end or bottom perspective view of the check valve of FIG. 11.
Figure 14:
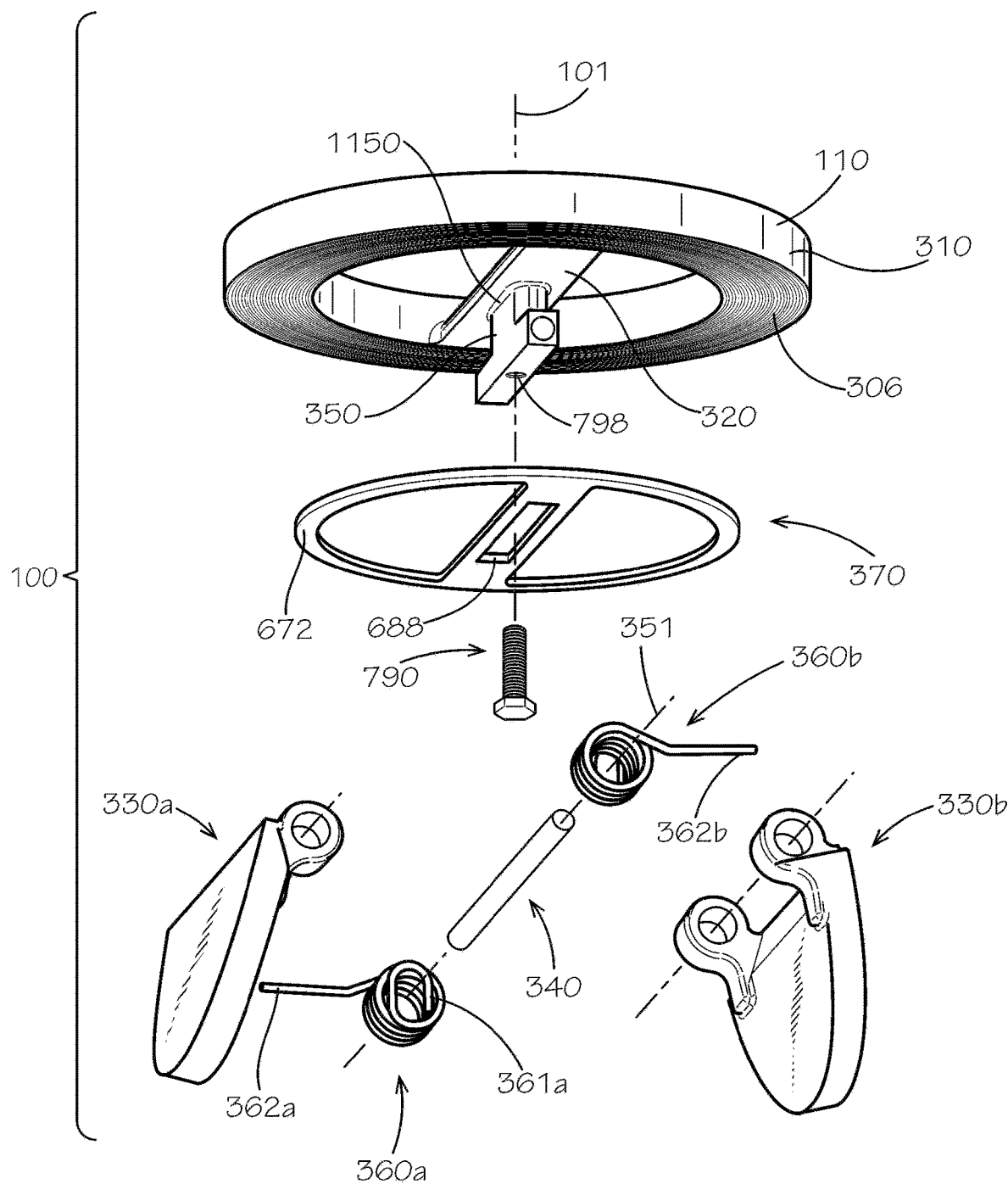
FIG. 14 is an exploded perspective view of the check valve of FIG. 11.

FIG. 12 is a first end or top perspective view, FIG. 13 is a second end or bottom perspective view, and FIG. 14 is an exploded perspective view of the check valve 100. As shown, the first end 361a,b of either respective biasing element 360a,b can define a plurality of bends and thereby can forming multiple locking turns of the first end 361a,b, which can together engage with the distal portion 354 of the position block 350. As shown, a total number of coils of the biasing element 360a,b can be reduced as needed so that the locking turn formed by the first end 361a,b, which can be facing towards the central axis 101, encircles and engages with the position block 350.

Figure 15:
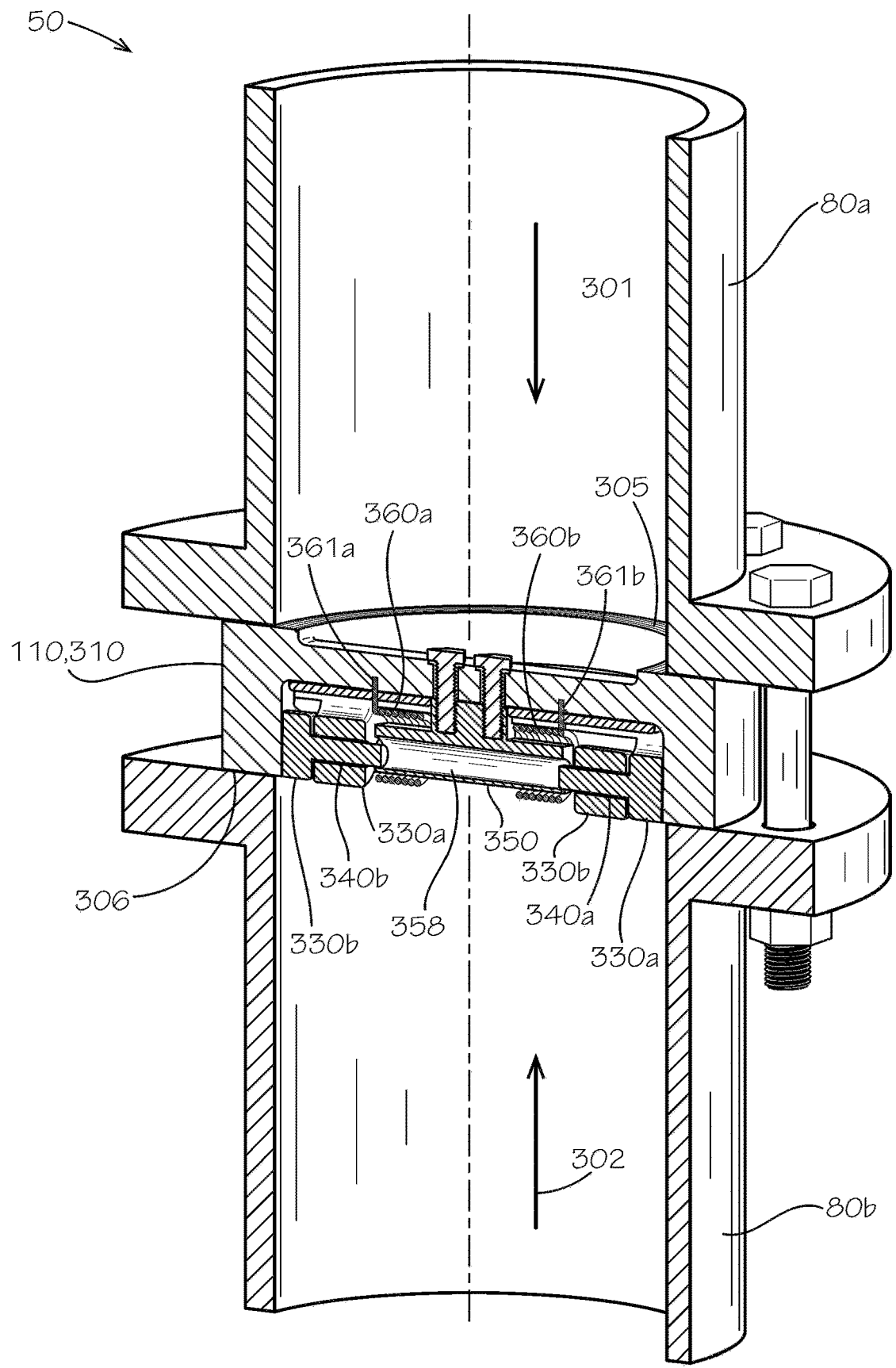
FIG. 15 is a sectional perspective view of the check valve of FIG. 1 taken along line 3-3 of FIG. 1 in accordance with another aspect of the current disclosure.

FIGS. 15-18 disclose the check valve 100 in accordance with another aspect of the current disclosure. FIG. 15 specifically is a sectional perspective view of the check valve 100 in a closed position. As shown, multiple pivot pins 340a,b can be fixed with respect to the respective valve member 330a,b. More specifically, the pivot pin 340a can extend from the valve member 330a and can be formed monolithically with the valve member 330a, and the pivot pin 340b can extend from the valve member 330b and can be formed monolithically with the valve member 330b. The pivot pins 340a,b can nonetheless be received by and captured in the pivot bore 358 of the position block 350 and the valve members 330a,b thereby held in position with respect to the valve body 110.

Figure 16:
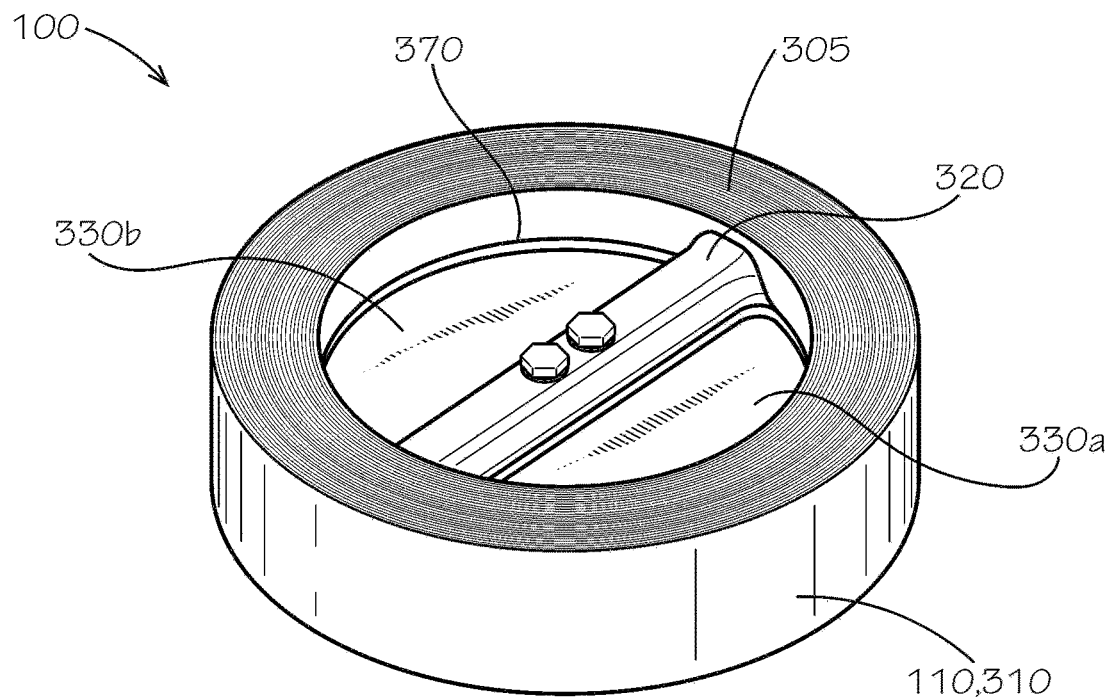
FIG. 16 is a first end or top perspective view of the check valve of FIG. 15.
Figure 17:
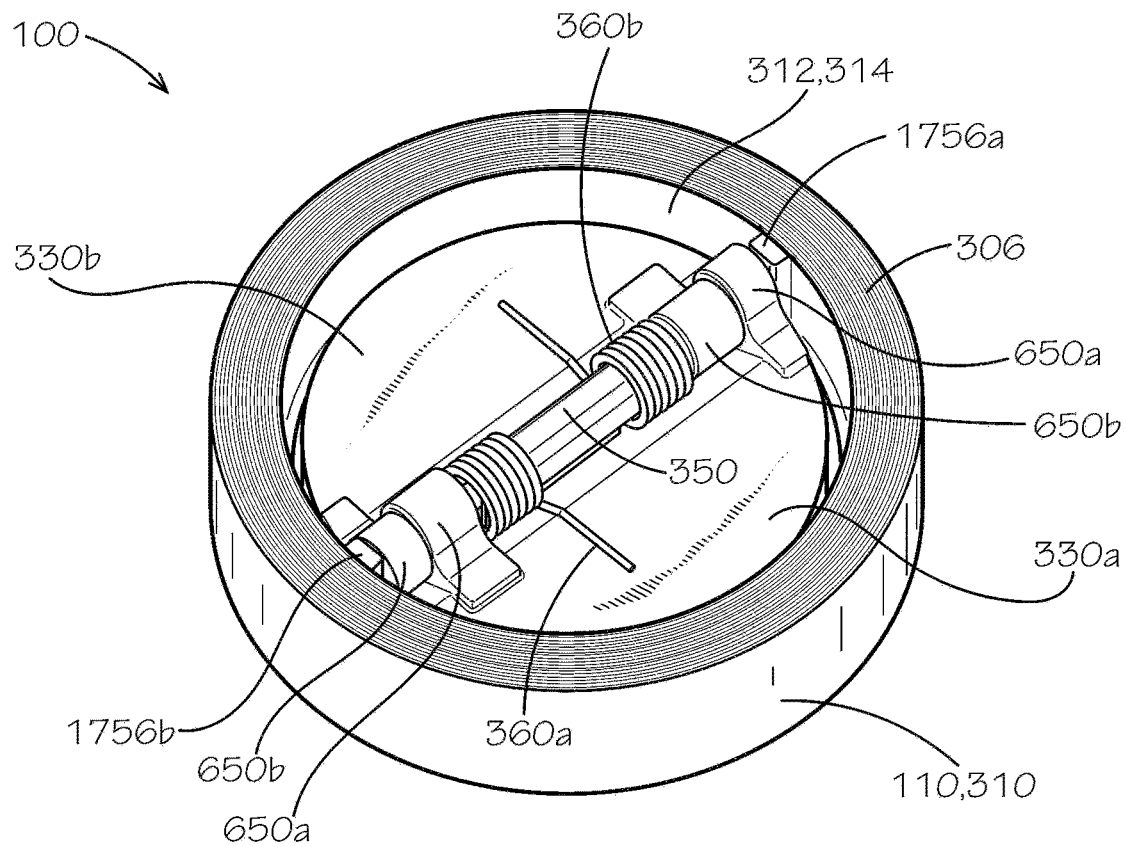
FIG. 17 is a second end or bottom perspective view of the check valve of FIG. 15.
Figure 18:
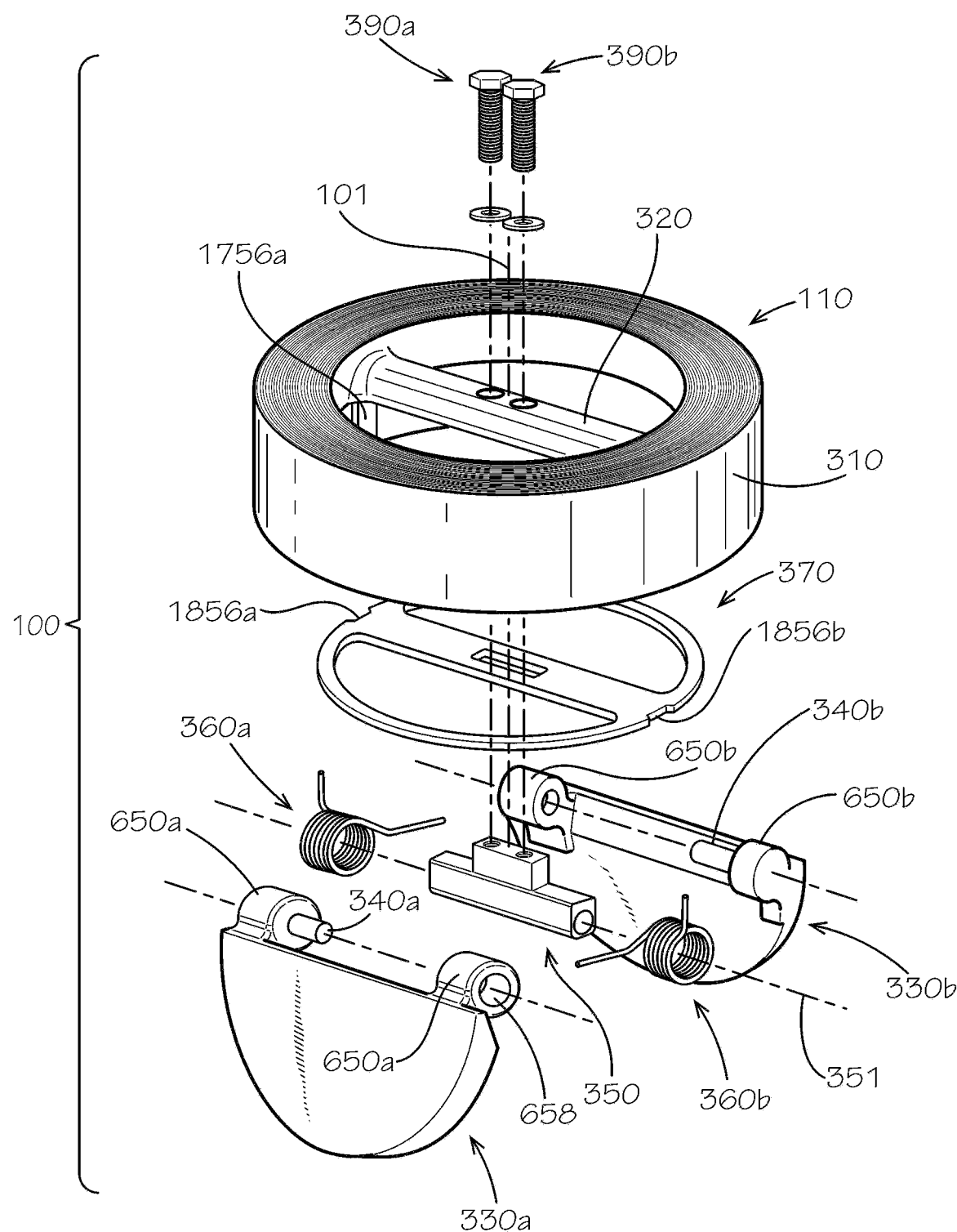
FIG. 18 is an exploded perspective view of the check valve of FIG. 15.

FIG. 16 is a first end or top perspective view, FIG. 17 is a second end or bottom perspective view, and FIG. 18 is an exploded perspective view of the check valve 100. As shown in FIG. 17, the valve body 110 can define ridges 1756a,b, which can extend from the valve inner cavity 312 and the valve bore 314. In some aspects, the ridges 1756a,b can fill a space that would otherwise be defined between the valve members 330a,b—and specifically a side of the lugs 650a,b, which can be planar—and the valve inner surface 314 of the annular body 310, which can be curved. More specifically, either or both of the ridges 1756a,b can define a flat surface against which the lugs 650a,b of the respective valve members 330a,b can contact. In some aspects, the ridges 1756a,b can otherwise help maintain a position of the valve members 330a,b. The seal 370 can define notches 1856a,b (shown in FIG. 18) to accommodate or receive the trunnions 356a,b.

Figure 19:
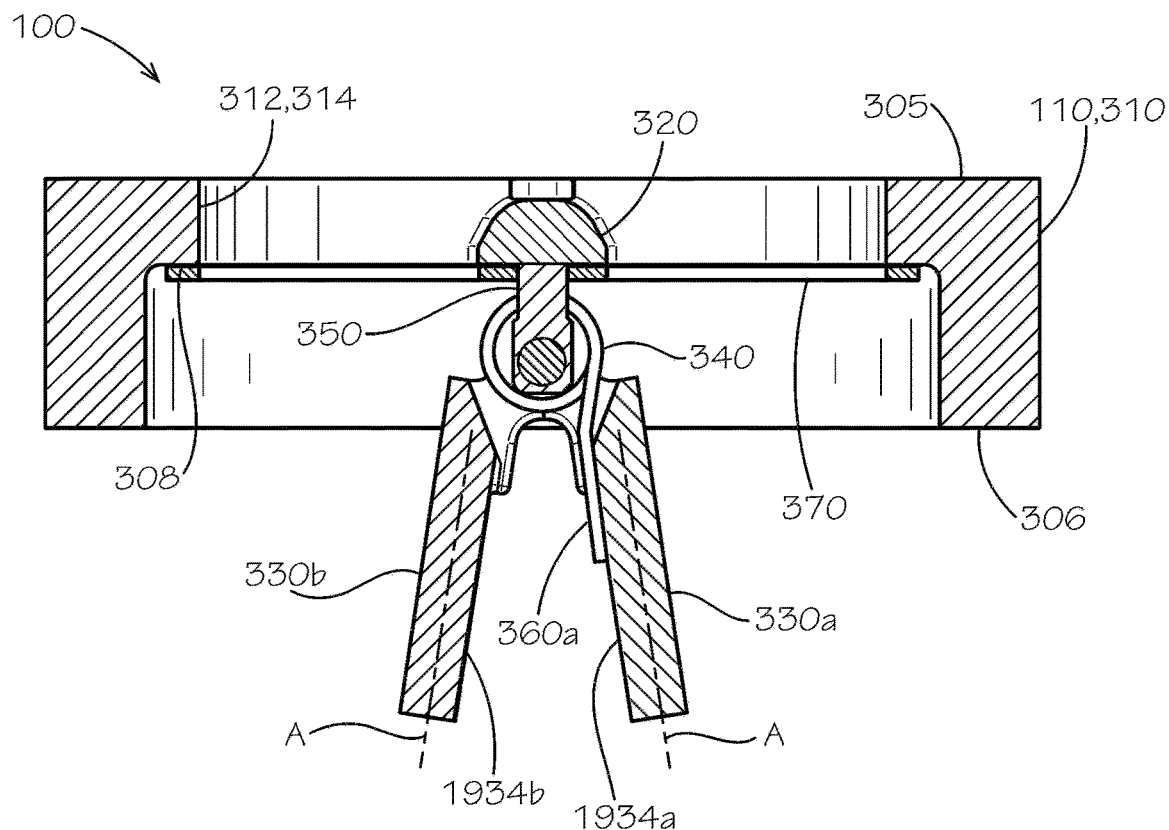
FIG. 19 is a sectional view of the check valve of FIG. 1 in an open position taken along line 20-20 of FIG. 4, which shows the check valve in a closed position.
Figure 20:
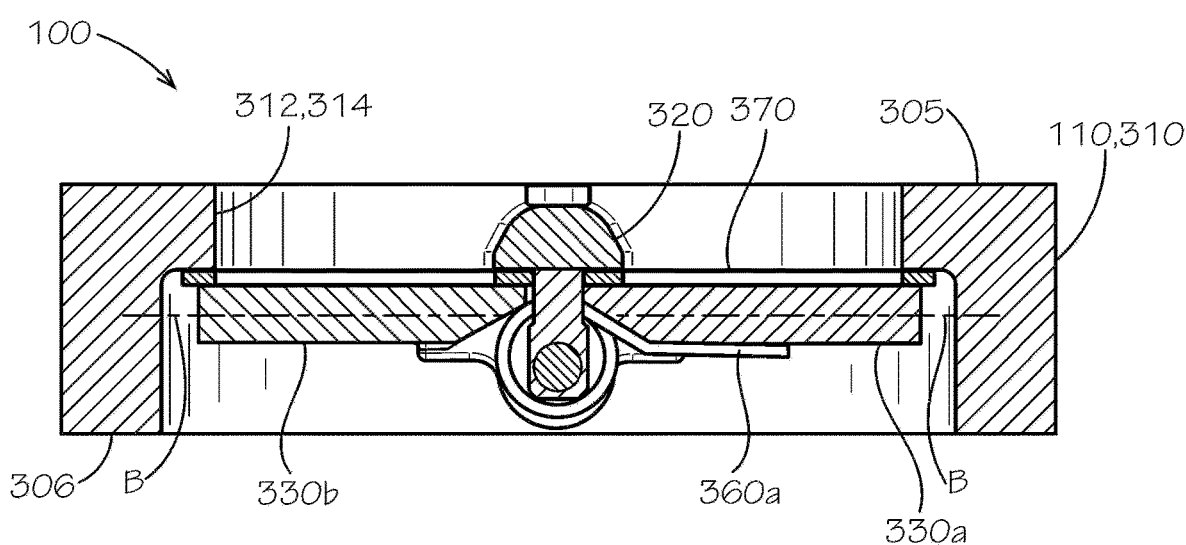
FIG. 20 is a sectional view of the check valve of FIG. 19 in the closed position.

FIGS. 19-22 disclose the check valve 100 in accordance with one or more of the above aspects of the current disclosure including the check valve shown in FIG. 3. FIG. 19 is specifically a sectional view of the check valve 100 showing the valve members 330a,b in an open position A, and FIG. 20 is a sectional view of the check valve 100 in the closed position B. As shown in FIG. 19, a second side 1934a,b of each of the valve members 330a,b can be at least partially facing the direction of flow of fluid through the check valve 100 such that flow of the fluid in the system 50 in the negative flow direction 302 will naturally rotate the valve members 330a,b towards the closed position from a position that biases the valve members 330a,b slightly towards the closed position instead of, for example, being aligned with a vertical direction.

Figure 21:
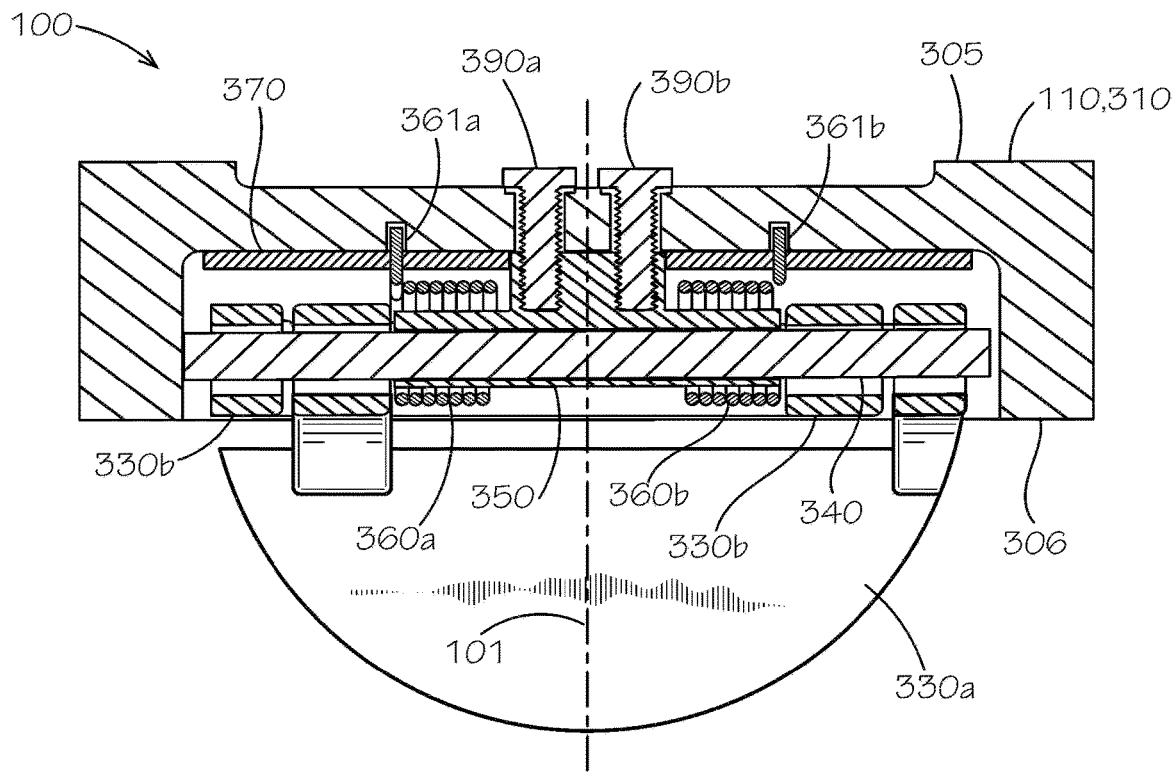
FIG. 21 is a sectional view of the check valve of FIG. 1 in an open or deployed position taken along line 22-22 of FIG. 4.
Figure 22:
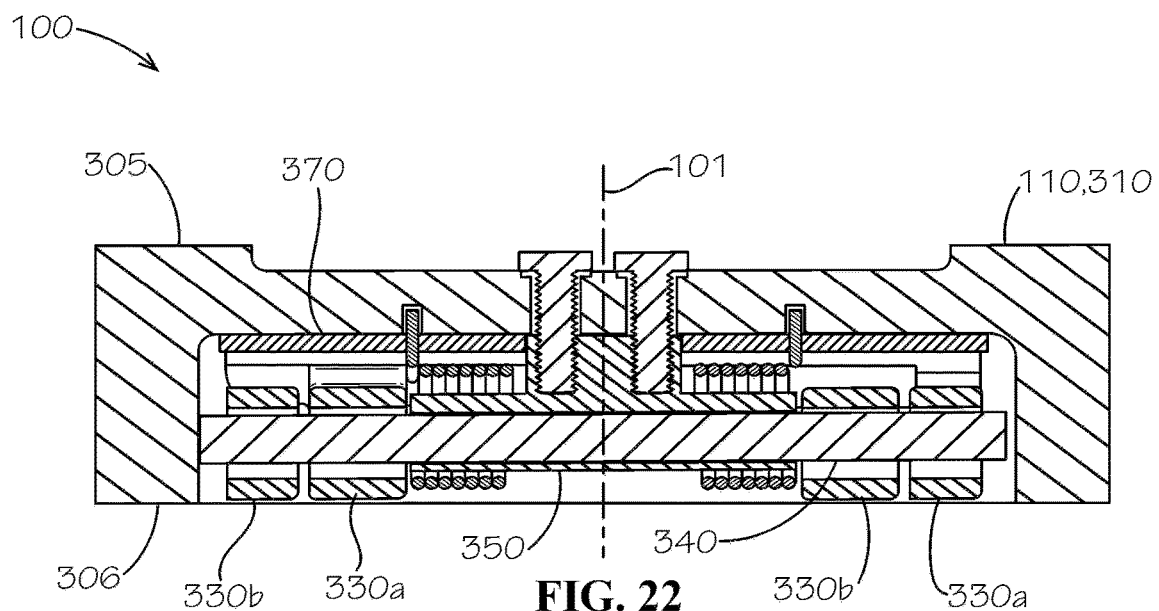
FIG. 22 is a sectional view of the check valve of FIG. 21 in a closed position.

FIG. 21 is a sectional view of the check valve 100 taken at 90 degrees to the sectional view of FIG. 19 showing the check valve 100 in an open position, and FIG. 22 is a sectional view of the check valve 100 of FIG. 21 in a closed position. The valve body 110 and the pivot pin 340 can define a gap therebetween to facilitate free or unrestricted rotation of the valve members 330a,b. Washers (not shown) can be installed on one or more opposing ends of the pivot pin 340 to optionally facilitate centering of the valve members 330a,b inside the valve body 110 about the central axis 101 and can be formed from an anti-friction or anti-corrosion material such as, for example and without limitation, acetal, nylon, or another polymer. In other aspects, each of the washers can be formed from any desirable material including a metal or a composite material.

Figure 23:
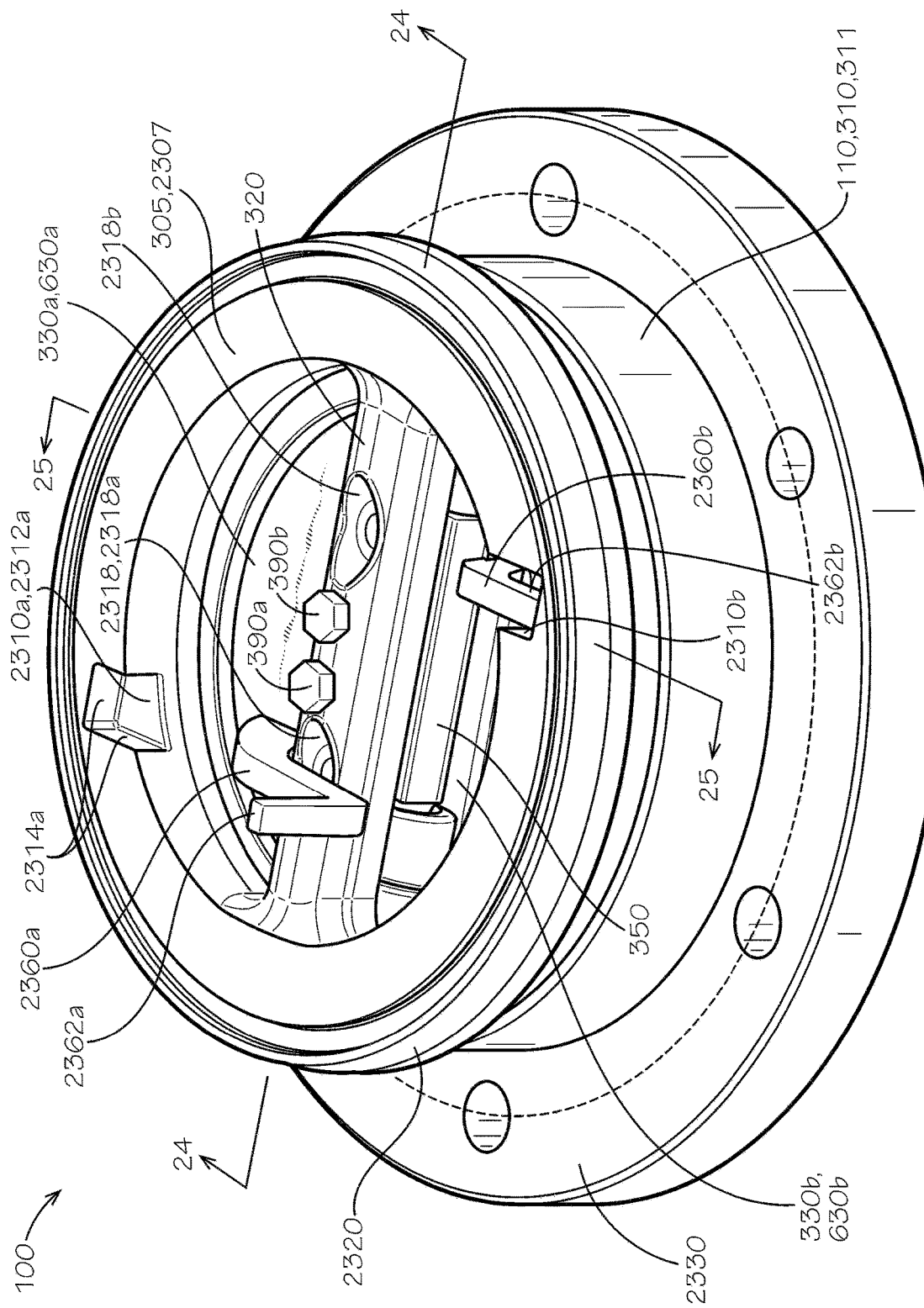
FIG. 23 is a first end or top perspective view of a check valve in accordance with another aspect of the current disclosure, with return springs of the check valve removed for clarity.
Figure 24:
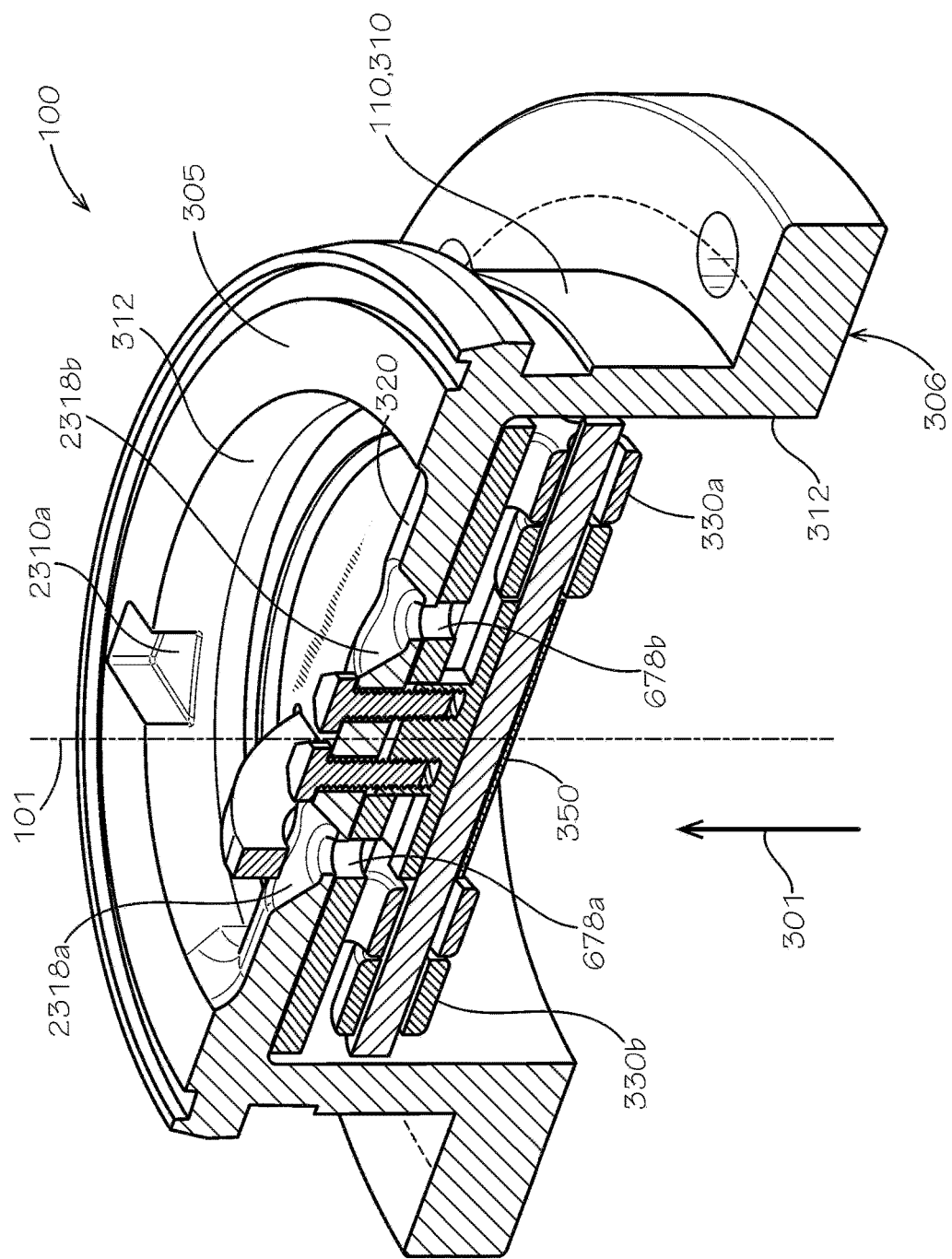
FIG. 24 is a sectional view of a check valve of FIG. 23 taken along line 24-24 of FIG. 23.
Figure 25:
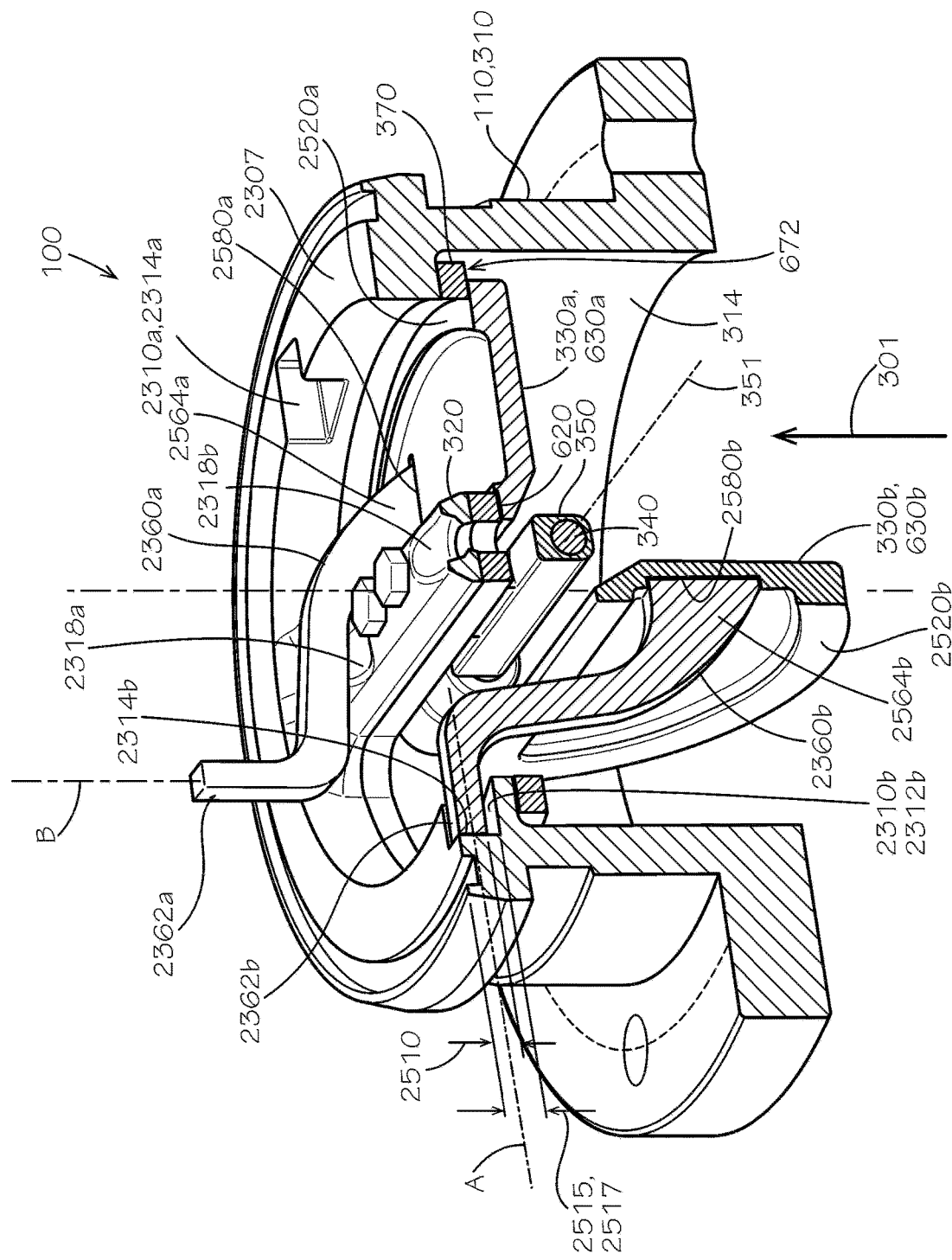
FIG. 25 is a sectional view of a check valve of FIG. 23 taken along line 25-25 of FIG. 23.

FIGS. 23-27 disclose the check valve 100, which can be a break check valve, in accordance with another aspect of the current disclosure comprising a pipe system termination fitting 2680 (shown in FIG. 26) such as, for example and without limitation, a hydrant. FIGS. 23-25 specifically disclose the check valve 100 in a partially closed position in which the valve member 330b is open and the valve member 330a is closed. In some aspects, the fluid in the system 50 can be configured to flow, when it does flow, from the second axial end 306 to the first axial end 305 and thus the positive flow direction 301 can be opposite from the positive flow direction 301 shown in FIG. 3.

FIG. 23 specifically is a first end or top perspective view of the check valve 100. As shown, the valve body 110 of the check valve 100 and, more specifically, the first axial end 305, can define a mating surface 2307. The valve body 110 can define the valve inner cavity 312. Again, the valve inner cavity 312 can define the valve bore 314, which can extend from the first axial end 305 to the second axial end 306; and, again, the valve body 110 can define the aforementioned watertight structure. As described above, the position block 350 can be secured to the valve body 110 and can define the pivot bore 358, which can receive the pivot pin 340. When the pipe system termination fitting 2680 is open (such as when pumping water from the pipe system termination fitting 2680) or when the pipe system termination fitting 2680 is dislocated from the system 50, the fluid in the system 50 can be configured to flow in the negative flow direction 302 from the second axial end 306 to the first axial end 305. As shown, the valve body 110 can define a top flange 2320, which can receive and support the pipe system termination fitting 2680, and a bottom flange 2330, which can be received and supported by the pipe fitting 80a (shown in FIG. 26).

As previously described, the valve members 330a,b can be positioned within the valve body 110 and can be configured to rotate about the pivot pin 340 from the open position A (shown in FIG. 25) to the closed position B (shown in FIG. 25). More specifically, the valve members 330a,b can be configured to remain in the open position A as long as a surface of the pipe system termination fitting 2680 remains in contact with the mating surface 2307 of the valve body 110. The pipe system termination fitting 2680 can be a hydrant or any other above-ground pipe fitting. The valve members 330a,b can further be configured to close when the pipe system termination fitting 2680 is separated from the mating surface 2307 of the valve body 110. More specifically, arms 2360a,b can extend from any one or more of the valve members 330a,b and can be configured to move and allow the valve members 330a,b to move to the closed position B when the pipe system termination fitting 2680 is separated from the mating surface 2307 of the valve body 110.

The respective arms 2360a,b of each of the valve members 330a,b can be shaped to clear (i.e., not physically interfere or collide with) the cross member 120 whether the valve members 330a,b—and the check valve 100 overall—are in the open position A or in the closed position B or somewhere in between. In some aspects, as shown, each of stop notches 2310a,b can define a bottom 2312a,b (2312b shown in FIG. 25) and a side wall 2314a,b (2314b shown in FIG. 25) and can be sized to receive a respective tip 2362a,b of the respective arm 2360a,b. In some aspects, the stop notches 2310a,b and the mating surface 2307 are not required, and the pipe system termination fitting 2680 can still be sufficiently secured to and supported by the check valve 100. The check valve 100 can incorporate any one or more of the aspects described above such as, for example and without limitation, the valve body 110 being monolithic, the position block 350 being formed monolithically with the valve body 110, and the valve members 330a,b being accompanied by and biased towards an open position or a closed position by the biasing elements 360a, b.

The cross member 120 can define a hole 2318 extending through the cross member 120 from a top surface to a bottom surface of the cross member 120. As shown, the cross member 120 can define more than one of the holes 2318 such as holes 2318a,b, a bore of each of which can be in fluid communication with each of an inner cavity of the pipe system termination fitting 2680 and the valve inner cavity 312 of the check valve 100. As shown, one or more of the holes 2318a,b can define a chamfer or other edge treatment at an entrance to the holes 2318a,b.

The arms 2360a,b can extend from the respective valve members 330a,b, and the check valve 100 can be held in an open position such as the open position A under a mounting flange of the pipe system termination fitting 2680 and, optionally, within stop notches 2310a,b of the valve body 110. As shown, the arms 2360a,b can be positioned entirely within the valve body 110 and not extend past the mating surface 2307 when the check valve 100 is in the open position A.

FIG. 24 is a sectional view of the check valve 100. As shown, the openings 678a,b of the seal 370 and the holes 2318a,b can be in fluid communication with each of the inner cavity of the pipe system termination fitting 2680 and the inner cavity of a neighboring portion of the system 50 such as, for example and without limitation, the pipe fitting 80a. The holes 2318a,b of the valve body 110 can be aligned with the openings 678a,b, respectively, so that together the opening 678a and the hole 2318a and, likewise, the opening 678b and the hole 2318b can facilitate such fluid communication. The openings 678a,b can be separate from the valve bore 314 and in fluid communication with a portion of the valve inner cavity 312 on either side of the valve members 330a,b when in the closed position B (shown in FIG. 25). Likewise, the hole 2318 or the holes 2318a,b can be separate from the valve bore 314 and in fluid communication with a portion of the valve inner cavity 312 on either side of the valve members 330a,b when in the closed position B of the check valve 100.

FIG. 25 is a sectional view of a check valve 100. In some aspects, the internal flange 308 can either not be present or can be cut away where the arms 2360a,b such that instead of the stop notches 2310a,b there is no part of the valve body 110 directly supporting or even contacting the tips 2362a,b of the respective arms 2360a,b.

A height 2515 of the side wall 2314a,b of each stop notch 2310a,b and a distance 2517 from the bottom 2312a,b of each stop notch 2310a,b to the mating surface 2307 of the valve body 110 can be at least a thickness 2510 of the tip 2362a,b of the arm 2360a,b. In some aspects, as shown, a lateral position of the arms 2360a,b can be aligned with a lateral position of the holes 2318a,b defined in the cross member 320. When the check valve 100 actuates and the valve members 330a close, the fluid shooting or passing through the holes 2318a,b and against the arms 2360a,b can push on the arms 2360a,b and particularly the tips 2362a,b of the respective arms 2360a,b to resist closure of the valve members 330a,b. This effect can be increased as the check valve 100 closes and a speed of the fluid flow through the holes 2318a,b increases such that as the check valve 100 closes it decelerates.

The arm 2360a—joined to the plate 630a—is shown raised up and out of the stop notch 2310a such as when no pipe system termination fitting 2680 is in contact with the mating surface 2307 of the valve body 110. As the valve members 330a,b of the check valve 100 move towards the closed position B, sealing portions 2520a,b of the respective plates 630a,b can approach and eventually seal against the lower surface 672 of the seal 370 while the arms 2360a,b can simultaneously wrap around the cross member 320 of the valve body 110 and the cross member 620 of the seal 370. One or both of the arms 2360a,b can extend in an axial direction of the check valve 100 past the mating surface 2307 of the valve body 110 when the corresponding valve member 330a,b is in the closed position (as shown by a position of the arm 2360a with the valve member 330a in the closed position) but not past the mating surface 2307 of the valve body 110 when the valve member 330a,b is in the open position (as shown by a position of the arm 2360b with the valve member 330b in the open position).

As shown, the arms 2360a,b can be formed separately from and be fastened to the plates 630a,b of the valve members 330a,b. In some aspects, the arms 2360a,b can be fastened to the plates 630a,b by welding or with weldments at a joint or seam between the arms 2360a,b and the plates 630a,b. In other aspects, the arms 2360a,b can be fastened to the plates 630a,b using another type of fastener such as, for example and without limitation, a screw or a pin or can slide or snap into position inside the plates 630a,b without the use of any fasteners.

More specifically, in some aspects, the plates 630a,b can define respective recesses 2580a,b, which can be sized to receive respective bases 2564a,b of the arms 2360a,b. In some aspects, to clear neighboring parts such as the cross member 320 during operation of the check valve 100, either or both of the arms 2360a,b can define an "S" shape when viewed from a side. Each of the arms 2360a,b can be mounted in an orientation or in a plane that is orthogonal to the pivot axis 351. Each of the plates 630a,b can be biased towards the closed position B. In some aspects, the sealing portions 2520a,b can define a greater thickness than a thickness of a web 2530a,b of each plate 6300a,b. The sealing portions 2520a,b can be flat or substantially flat to adequately seal against a mating surface of the check valve 100 such as, for example and without limitation, the seal 370, which can also be flat as shown.

In some aspects a portion of either or both of the valve members 330a,b or, more specifically, the plates 630a,b can define a hole (not shown), which can be similar in purpose to the holes 2318a,b of the cross member 320 or the openings 678a,b of the seal 370. Such a hole can be in fluid communication with each of the inner cavity of the pipe system termination fitting 2680 and the valve inner cavity 312 or can be in fluid communication with a portion of the valve inner cavity 312 on either side of the valve members 330a,b when each of the valve members 330a,b is in the closed position B.

Figure 26:
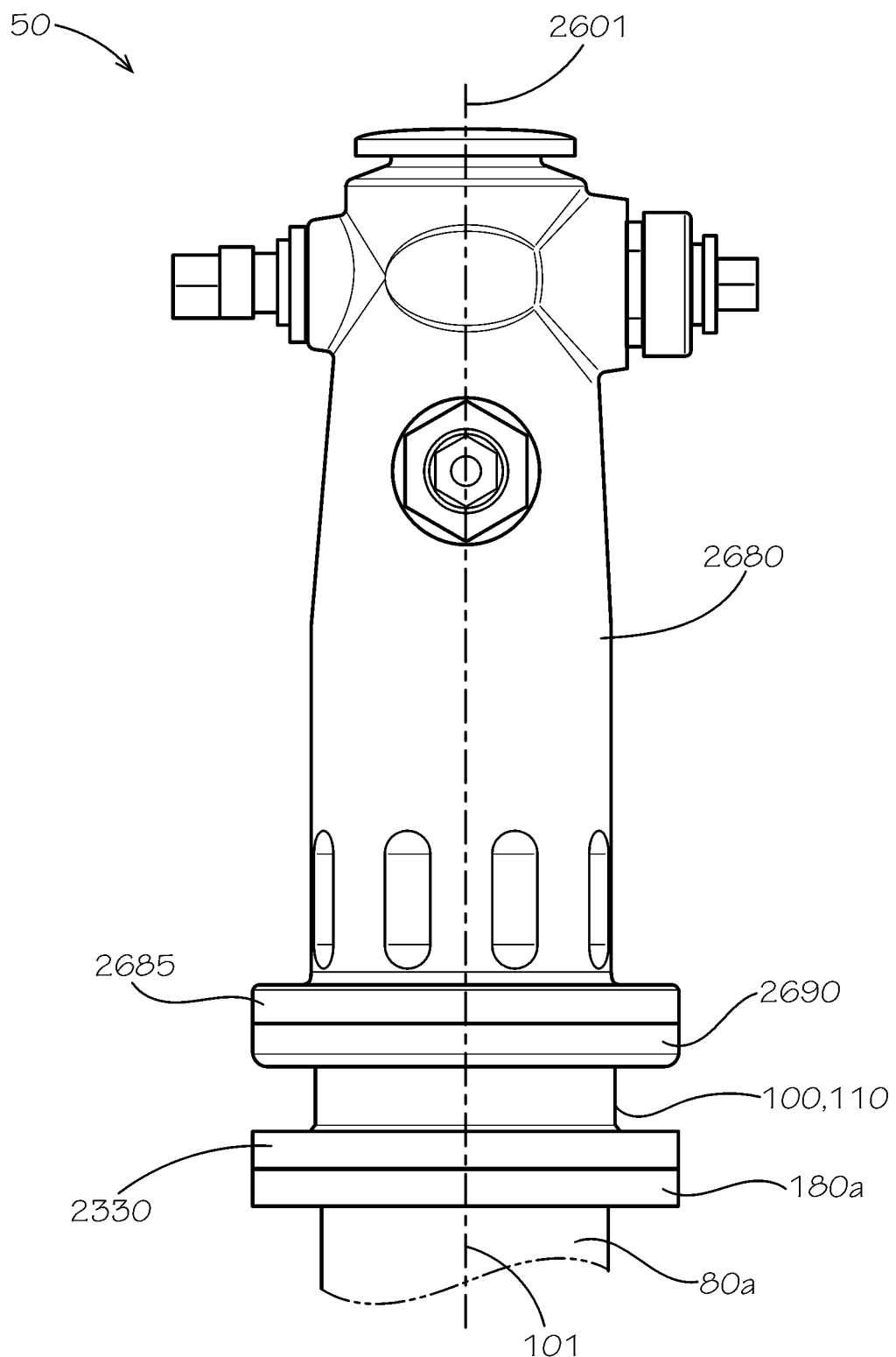
FIG. 26 is a side elevation view of a hydrant assembled to the check valve of FIG. 23 in accordance with one aspect of the current disclosure.

FIG. 26 is a side elevation view of the pipe system termination fitting 2680—shown as a fire hydrant—assembled to the check valve 100 in accordance with one aspect of the current disclosure. FIG. 26 specifically is a side view of the pipe system termination fitting 2680 defining an axis 2601 of the pipe system termination fitting 2680 and assembled to the check valve 100 along the central axis 101 of the check valve 100. Each of the axis 2601 and the central axis 101 can be a longitudinal axis of the pipe system termination fitting 2680 and the check valve 100, respectively. The pipe system termination fitting 2680 and the check valve 100 can form a portion of the system 50.

The pipe system termination fitting 2680 can be secured to the top flange 2320 (shown in FIG. 27) of the check valve 100 with a frangible connection such as, for example and without limitation, a traffic flange 2690. The traffic flange 2690 can be secured to the pipe system termination fitting 2680 with fasteners (not shown) such as, for example, through-bolts configured to extend through mounting holes (not shown) defined in each of the traffic flange 2690 and a mounting flange 2685 of the pipe system termination fitting 2680. The check valve 100, and specifically the bottom flange 2330 thereof, can itself be secured to the mounting holes 188 (shown in FIG. 1) defined in the flange 180a of the pipe fitting 80a. The pipe system termination fitting 2680 can be configured to couple to and be in fluid communication with these and other portions of the system 50.

Even while still at least partially assembled to the mounting flange 2685 of the pipe system termination fitting 2680, the traffic flange 2690 can be configured to fail before other components of the system 50 and permit complete dislocation of the pipe system termination fitting 2680 from the system 50 upon impact to the pipe system termination fitting 2680 by an object such as a moving vehicle (in other words, when the pipe system termination fitting 2680 is run over and knocked off by the vehicle). Because the traffic flange 2690 is frangible, the check valve 100 itself and other components of the system 50 need not be frangible themselves.

As shown, the pipe system termination fitting 2680 can be a wet barrel hydrant. In a wet barrel hydrant during its normal operation, a hydrant inner cavity (not shown) is filled with the fluid of the system 50—again, typically water in the case of the pipe system termination fitting 2680. Also in a wet barrel hydrant during its normal operation, the valve inner cavity 312 (shown in FIG. 3) is in fluid communication with both the inner cavity of the pipe system termination fitting 2680 and the inner cavity of the pipe fitting 80a, at least when the check valve 100 is open or unactuated.

Figure 27:
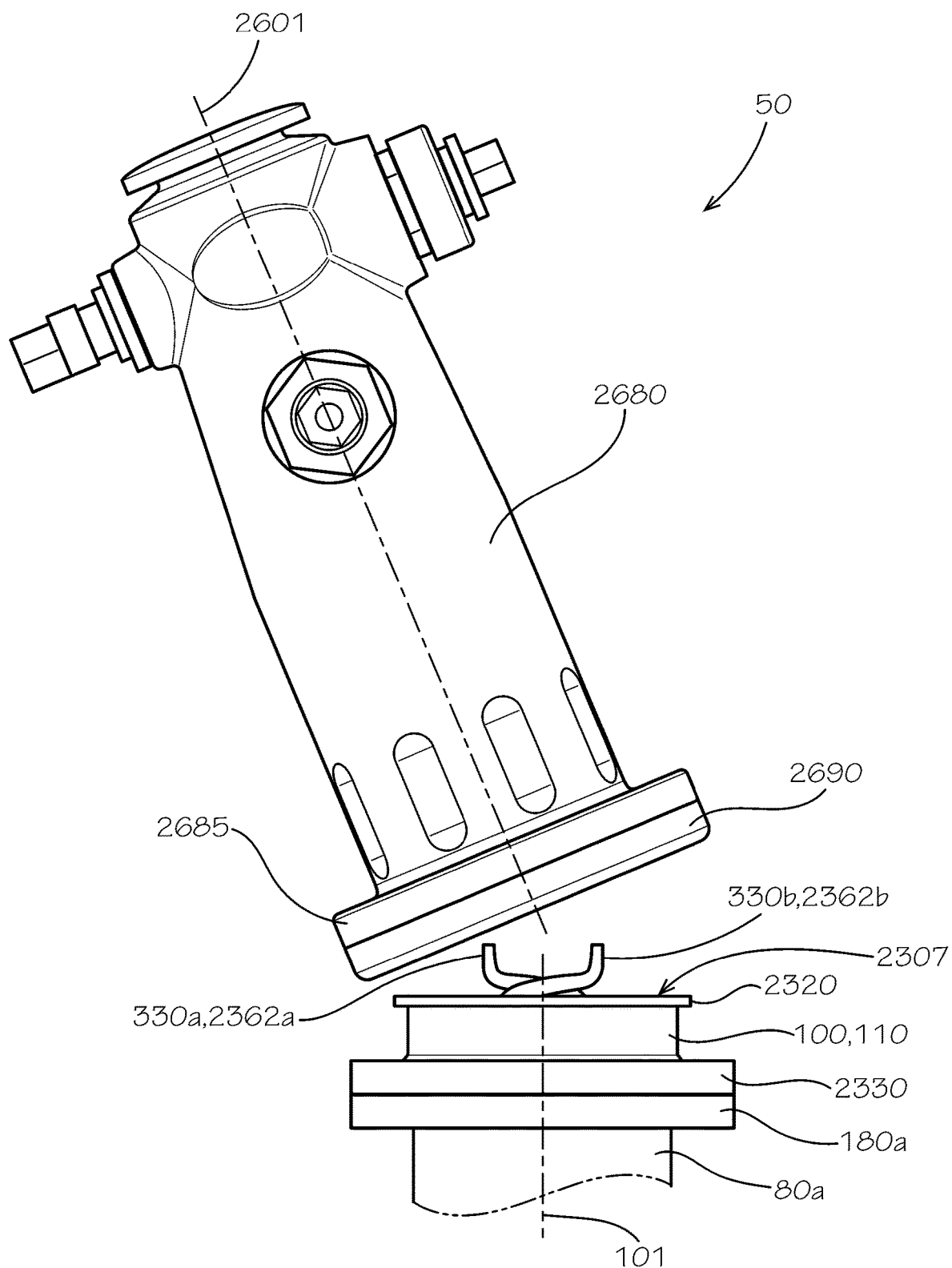
FIG. 27 is a side elevation view of the hydrant of FIG. 26 after its dislocation from the break check valve of FIG. 23.

FIG. 27 is a side elevation view of the pipe system termination fitting 2680 after its dislocation from the check valve 100. Again, the check valve 100 can comprise the valve body 110 and valve members 330a,330b and can be configured to move inside the valve body 110 of the check valve 100 about the pivot pin 340 (shown in FIG. 25). As shown, an entirety of the pivot pin 340 can be contained within the valve body 110 and not extend through or require any openings in the exterior surface 311. Again, as shown, the arms 2360a,b (shown in FIG. 25) and, more specifically, the tips 2362a,b thereof can extend in an axial direction of the check valve 100 past the mating surface 2307 of the valve body 110 when the corresponding valve member 330a,b is in the closed position.

Dislocation of the pipe system termination fitting 2680, which can result from the aforementioned impact by a moving vehicle but can also result from other circumstances, could cause significant water loss were it not for immediate actuation or closure of the check valve 100. Without the check valve 100, this water loss is possible because the pipe system termination fitting 2680, at least when it is a wet barrel hydrant, is typically filled or pressurized with water. In some aspects, as shown, closure of the check valve 100 can be evident by rotation of the valve members 330a,b inside the valve body 110 about the pivot pin 340.

A method for using the system 50 or any portion thereof can comprise providing the system 50 or any portion thereof as disclosed herein. As shown in FIGS. 1-22, the method can comprise maintaining an open position of the valve members 330*a,b* as long as the fluid of the system 50 flows in the positive flow direction 301 of the check valve 100. The method can further comprise automatically rotating the valve members 330*a,b* of the check valve 100 from an open position to a closed position of the check valve 100 when the fluid of the system 50 flows in the negative flow direction 302 of the check valve 100. The method can further comprise the valve members 330*a,b* during closure changing their respective positions or orientations with respect to the valve body 110 of the check valve 100. As also shown, the method can comprise the valve members 330*a,b* in the closed position of the check valve 100 substantially stopping or completing stopping flow of the fluid from the system 50. By "substantially stopping flow," including as shown with respect to exemplary aspects shown in FIGS. 1-22, it is meant that all flow is stopped except for any incidental flow from valve due to minor gaps between the parts when the valve is closed and any purposeful backflow of the fluid.

As shown in FIGS. 23-27, the method can comprise automatically rotating the valve members 330*a,b* of the check valve 100 from an open position to a closed position of the check valve 100 when the pipe system termination fitting 2680 is separated from the check valve 100. Again, the method can further comprise the valve members 330*a,b* during closure changing their respective positions or orientations with respect to the valve body 110 of the check valve 100, and the method can further comprise the valve members 330*a,b* in the closed position of the check valve 100 substantially stopping flow of the fluid from the system 50. By "substantially stopping flow," including as shown with respect to exemplary aspects shown in FIGS. 23-27, it is meant that all flow is stopped except for any incidental flow from valve due to minor gaps between the parts when the valve is closed and any purposeful venting or streaming of water as described below—such as to alert passersby of a problem with the pipe system termination fitting 2680. In some aspects, leakage due to gaps and any purposeful venting of water as described can measure less than 5% of total flow.

The method can comprise expelling a limited stream of water from the check valve 100 through the hole(s) 2318*a,b* defined in a one of the valve body 110 and the valve members 330*a,b* when the check valve 100 is in the closed position to indicate closure of the check valve 100 and a resulting need for attention and service by appropriate service personnel. In some aspects, the method can comprise expelling a stream of water from the check valve 100 and through the cross member 320 or the valve members 330*a,b* of the check valve 100. For example, the stream of water could be a focused jet extending high enough into the air (a minimum of five feet, in some aspects, to reach above a top of a parked vehicle) for one to notice it. In some aspects, the method can comprise expelling the stream of water from the check valve 100 and through a gap defined between the cross member 320 or the valve members 330*a,b* and the valve body 110 of the check valve 100. By expelling water from the check valve 100 when the check valve 100 is closed, the valve can, as noted above, effectively and clearly indicate to passersby that something may be amiss with the pipe system termination fitting 2680 and specifically that the pipe system termination fitting 2680 may be dislocated from its usual position, giving them and any nearby public safety personnel the ability to notify responsible parties that the pipe system termination fitting 2680 requires attention.

In some aspects, as described above, rotating the valve members 330*a,b* of the check valve 100 can comprise rotating a single valve disc such as the plate 450 about the pivot pin 240 of the check valve 100 from the open position A to the closed position B. In any case, the valve members 330*a,b* can extend substantially in all directions across the valve bore 314 defined in the valve body 110 when the check valve 100 is in the closed position B. In other aspects, rotating the valve members 330*a,b* of the check valve 100 can comprise rotating a pair of valve discs or plates 630*a,b* about the pivot pin 340 of the check valve 100 from the open position A to the closed position B.

In some aspects, rotating the valve members 330*a,b* of the check valve 100 can comprise expelling a hold-open bar (not shown) from the check valve 100 and thereby allowing rotation of the valve members 330*a,b* within the valve body 110 from the open position A to the closed position B. Furthermore, rotating the valve members 330*a,b* of the check valve 100 can comprise slowing the speed of the valve members 330*a,b* proximate to the closed position B. In some aspects, slowing the speed of the valve member 250 can comprise contacting the valve members 330*a,b* with a biasing member (not shown) or a fluid-filled piston.

The method can comprise installing the pipe system termination fitting 2680 at any angular position about the central axis 101 and/or the axis 201 with respect to an angular position of the check valve 100 without affecting the ability of the check valve 100 to remain closed when the pipe system termination fitting 2680 is coupled to the check valve 100 and open when the pipe system termination fitting 2680 is separated from the check valve 100. This rotation of the pipe system termination fitting 2680 to a desirable angular position based on the availability of multiple angular positions is called "clocking" of the pipe system termination fitting 2680. The method can comprise re-using the check valve 100 as-is after actuation of the check valve 100 and after coupling a replacement pipe system termination fitting 2680 to the check valve 100.

In some aspects, the check valve 100 and various components thereof can be formed from or comprise an iron (including cast iron and ductile iron), bronze, or steel material including stainless steel or even a plastic (e.g., polymeric) or composite material, which can be reinforced with fibers. In other aspects, any suitable materials can be used.

As shown, the check valve 100 can be easily replaced by a new check valve 100, or the check valve 100 can replace an older style valve or be installed where no break check valve is currently installed. The check valve 100 can also be reset without replacement or modification upon reinstallation of the pipe system termination fitting 2680 by returning the components of the check valve 100 to their respective original positions. Significant weight and cost savings can be achieved with a valve such as the check valve 100 disclosed herein. Including with respect to the aspects shown in FIGS. 23-27, one older style break check valve, for example, can weigh up to 200 pounds or more and require that an installation height, which can be equal to the overall axial length 307 (shown, e.g., in FIG. 3) from end to end in the axial direction be approximately two feet or more. In contrast, in some aspects, the check valve 100 disclosed herein can weigh as little as approximately 40 pounds and the installation height and the overall axial length 307 can both measure as little as two inches. In some aspects, the axial length 317 (shown in FIG. 7) or the minimum axial length 317' (shown in FIG. 7) of a portion of the valve 100 such as the flange 710 or even the entire valve 100 in the closed position can measure less than two inches. In some aspects, the axial length 317 or the minimum axial length 317' of a portion of the valve 100 can measure one inch or less. In some aspects, the axial length 317 or the minimum axial length 317' of a portion of the valve 100 can measure ⅛ inch or less.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A check valve comprising:
 a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member;
 a position block extending from the cross member;
 a valve member positioned within the valve body and configured to rotate between an open position and a closed position; and
 a pivot pin extending from an adjacent portion of the valve member, engaged with the position block, fixed with respect to the valve member, and formed monolithically with the valve member; the valve member and the pivot pin configured to rotate together between the open position and the closed position.

2. The check valve of claim 1, wherein the valve body is monolithic.

3. The check valve of claim 1, wherein the valve body defines ridges extending from the valve bore in a space between the valve body and the valve member extending along an axis defined by the pivot pin.

4. The check valve of claim 1, further comprising a seal positioned between the valve body and the valve member in the closed position of the valve.

5. The check valve of claim 4, wherein the seal defines notches to accommodate geometry of an adjacent component of the check valve.

6. The check valve of claim 1, wherein the valve member is held in one of the open position and the closed position by a biasing element.

7. The check valve of claim 6, wherein the biasing element is a torsion spring.

8. A check valve comprising:
 a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member;
 a position block extending from the valve body;
 a pair of valve members positioned within the valve body and configured to rotate between an open position and a closed position; and
 a pair of pivot pins, each pivot pin of the pair of pivot pins extending from an adjacent portion of each valve member of the pair of valve members, engaged with the position block, fixed with respect to the corresponding valve member, and formed monolithically with the corresponding valve member; each valve member and the corresponding pivot pin configured to rotate together between the open position and the closed position.

9. The check valve of claim 8, wherein the valve body is monolithic.

10. The check valve of claim 8, wherein the valve body defines ridges extending from the valve bore in a space between the valve body and at least one of the pair of valve members and extending along an axis defined by the pivot pin formed monolithically with the at least one of the pair of valve members.

11. The check valve of claim 8, wherein each pivot pin extends from a lug of the corresponding valve member, a diameter of the pivot pin being smaller than a diameter of the lug.

12. The check valve of claim 8, wherein each pivot pin is received by and captured in a pivot bore of the position block.

13. The check valve of claim 8, wherein at least one of the pair of valve members is held in one of the open position and the closed position by a biasing element.

14. The check valve of claim 13, wherein the biasing element is a torsion spring.

15. The check valve of claim 14, wherein a position of one end of the torsion spring is fixed with respect to one of the position block and the valve body.

16. The check valve of claim 8, wherein the valve body defines a mating surface facing in an axial direction of the valve body and configured to receive a pipe system termination fitting.

17. The check valve of claim 16, further comprising an arm extending from at least one of the pair of valve members in an axial direction of the valve body to at least the mating surface of the valve body, the arm also extending in an axial direction of the valve body past the mating surface of the valve body when the at least one of the pair of valve members is in the closed position but not past the mating surface of the valve body when the at least one of the pair of valve members is in the open position.

18. The check valve of claim 8, wherein an overall length of a distal portion of the position block is greater than a length of a base portion of the position block.

19. A check valve comprising:
- a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member;
- a position block extending from the cross member;
- a valve member positioned within the valve body and configured to rotate between an open position and a closed position;
- a pivot pin extending from the valve member, engaged with the position block, and fixed with respect to the valve member; the valve member and the pivot pin configured to rotate together between the open position and the closed position; and
- an arm extending from the valve member in an axial direction of the valve body to at least a mating surface of the valve body, the mating surface facing in an axial direction of the valve body and configured to receive a pipe system termination fitting, the arm also extending in an axial direction of the valve body past the mating surface when the valve member is in the closed position but not past the mating surface when the valve member is in the open position.

20. A check valve comprising:
- a valve body defining a valve bore extending from a first axial end to a second axial end, the valve body comprising an annular body and a cross member secured to and extending across the valve bore from the annular body on one side of the valve body to the annular body on an opposite side of the valve body, the valve bore at the cross member divided into more than one portion by the cross member;
- a position block extending from the valve body;
- a pair of valve members positioned within the valve body and configured to rotate between an open position and a closed position;
- a pair of pivot pins, a pivot pin of the pair of pivot pins extending from each valve member of the pair of valve members, engaged with the position block, and fixed with respect to the corresponding valve member; each valve member and the corresponding pivot pin configured to rotate together between the open position and the closed position; and
- an arm extending from at least one of the pair of valve members in an axial direction of the valve body to at least a mating surface of the valve body, the mating surface facing in an axial direction of the valve body and configured to receive a pipe system termination fitting, the arm also extending in an axial direction of the valve body past the mating surface when the at least one of the pair of valve members is in the closed position but not past the mating surface when the at least one of the pair of valve members is in the open position.

* * * * *